(12) United States Patent
Inoue

(10) Patent No.: US 7,773,137 B2
(45) Date of Patent: Aug. 10, 2010

(54) IMAGING APPARATUS, IMAGING ELEMENT, AND IMAGE PROCESSING METHOD

(75) Inventor: Tadao Inoue, Kawasaki (JP)

(73) Assignee: Fujitsu Semiconductor Limited, Yokohama (JP)

(*) Notice: Subject to any disclaimer, the term of this patent is extended or adjusted under 35 U.S.C. 154(b) by 407 days.

(21) Appl. No.: 11/808,823

(22) Filed: Jun. 13, 2007

(65) Prior Publication Data

US 2007/0257998 A1 Nov. 8, 2007

Related U.S. Application Data

(63) Continuation of application No. PCT/JP2004/018824, filed on Dec. 16, 2004.

(51) Int. Cl.
H04N 5/335 (2006.01)
H04N 5/228 (2006.01)

(52) U.S. Cl. .................. 348/277; 348/276; 348/279; 348/275; 348/222.1

(58) Field of Classification Search .............. 348/272, 348/273, 276, 279, 234–238, 277, 222.1
See application file for complete search history.

(56) References Cited

U.S. PATENT DOCUMENTS

| | | | | |
|---|---|---|---|---|
| 5,305,096 A | * | 4/1994 | Yamagami et al. | 348/242 |
| 5,579,047 A | * | 11/1996 | Yamagami et al. | 348/242 |
| 6,876,384 B1 | * | 4/2005 | Hubina et al. | 348/223.1 |
| 6,885,398 B1 | * | 4/2005 | Sladen | 348/273 |
| 6,967,748 B1 | * | 11/2005 | Takarada | 358/1.9 |
| 2005/0285955 A1 | * | 12/2005 | Utz et al. | 348/265 |
| 2006/0017829 A1 | * | 1/2006 | Gallagher | 348/276 |
| 2006/0146067 A1 | * | 7/2006 | Schweng et al. | 345/591 |
| 2008/0012969 A1 | * | 1/2008 | Kasai et al. | 348/266 |
| 2009/0322802 A1 | * | 12/2009 | Noguchi et al. | 345/694 |

FOREIGN PATENT DOCUMENTS

| | | | |
|---|---|---|---|
| JP | 58-075393 A | 5/1983 |
| JP | 04-088672 A | 3/1992 |
| JP | 04-088781 A | 3/1992 |
| JP | 4-88782 A | 3/1992 |
| JP | 2001-119705 A | 4/2001 |
| JP | 2002-300589 A | 10/2002 |
| JP | 2002-534866 A | 10/2002 |
| JP | 2003-199117 A | 7/2003 |
| JP | 2003-318375 A | 7/2003 |
| JP | 2003-244712 A | 8/2003 |

\* cited by examiner

*Primary Examiner*—Tuan Ho
*Assistant Examiner*—Marly Camargo
(74) *Attorney, Agent, or Firm*—Arent Fox LLP

(57) ABSTRACT

An imaging element includes a pixel group that has pixels arranged two dimensionally therein, each including a photoelectric converting unit. The pixel arrangement of the pixel group is m rows by n columns. In the pixel group, a pixel area of an arbitrary two rows by two columns respectively includes a red pixel, a green pixel, a blue pixel and a non-color pixel. A red color signal for a given red pixel is a signal value obtained from the pixel. A green signal for the red pixel is obtained by averaging the signal values of two green pixels adjacently on the right and the left of the pixel. A blue signal for the red pixel is obtained by averaging the signal values of four blue pixels adjacently on the upper-right, the upper-left, the lower-right, and the lower-left of the pixel.

19 Claims, 23 Drawing Sheets

PRIOR ART

IMAGING APPARATUS, IMAGING ELEMENT, AND IMAGE PROCESSING METHOD

CROSS-REFERENCE TO RELATED APPLICATION

This application is a continuation application of and claims the benefit of International Application No. PCT/JP2004/018824, filed Dec. 16, 2004. The disclosure of the prior application is hereby incorporated herein in its entirety by reference.

BACKGROUND OF THE INVENTION

1. Field of the Invention

The present invention relates to an imaging apparatus, element, and image processing method.

2. Description of the Related Art

FIG. 29 is a diagram illustrating a two-dimensionally arranged pixel group of a conventional solid-state imaging element. As illustrated in FIG. 29, in a two-dimensionally arranged pixel group 2901, primary color (RGB) separating filters are arranged respectively on pixels in a Bayer arrangement.

According to a conventional technique in Japanese Patent Application Laid-Open Publication No. 2003-318375, a solid-state imaging element is disclosed that captures an image having brightness resolution that is not influenced by color information of the subject. The solid-state imaging element includes photodiodes arranged horizontally and vertically. Brightness filters Y are provided for photodiodes that are arranged in checkers of the photodiodes. Color filters R, G, and B are provided for the remaining photodiodes that are arranged in checkers and not provided with brightness filters Y.

According to another conventional technique in Japanese Patent Application Laid-Open Publication No. 2003-244712, an imaging element is disclosed that includes pixels arranged in a pattern similar to the Bayer arrangement shown in FIG. 29. The pixel arrangement of this imaging element differs from the Bayer arrangement shown in FIG. 29 in that the pixel arrangement has fewer "G" pixels. Therefore, normally, when an image is captured, a color difference signal is produced using pixel outputs of "R", "G", and "B" and a brightness signal is produced using pixel output of pixels on which no color filters are formed.

However, recently, reduced camera size along with increased pixels has been demanded. Therefore, in the above mentioned solid-state imaging element employing the Bayer arrangement shown in FIG. 29, the area per one pixel is decreased due to the reduced camera-size and increased pixels therein and, simultaneously, the area of the photodiode decreases. Therefore, a problem of insufficient sensitivity has arisen. In particular, the color specific separating filters cause reduced sensitivity by weakening the brightness component of incoming visual light because each color separating filter only transmits the frequency component of the color that respectively corresponds thereto.

According to the conventional technique in Japanese Patent Application Laid-Open Publication No. 2003-318375, a problem arises in that, while the brightness resolution which is not influenced by the color information of the subject is improved, the resolution of the color information (color difference) obtained is degraded to one half of the original value when lighting is bright.

According to the conventional technique in Japanese Patent Application Laid-Open Publication No. 2003-244712, because the color difference signal is produced using the. RGB pixel output, while the color resolution is improved when lighting is bright, only one pixel of four pixels does not have a color separation filter formed thereon. Therefore, a problem arises in that the brightness resolution obtained is degraded when lighting is bright.

To solve the problems arising with the above conventional techniques, an object of the present invention is to provide an imaging apparatus, an imaging element, and an image processing method, that can facilitate improvement of the image quality of images captured regardless of whether lighting is bright or dim, by achieving high-resolution brightness when lighting is bright and high sensitivity when lighting is dim.

SUMMARY OF THE INVENTION

It is an object of the present invention to at least solve the above problems in the conventional technologies.

An imaging apparatus according to an aspect of the present invention includes an imaging element having a pixel group that is two-dimensionally-arranged, wherein the pixel group includes color pixels each having a color separating filter that transmits a specific color and non-color pixels that do not have the color separating filter; and a first brightness information producing unit that produces a first brightness information of a pixel in the pixel group, wherein the first brightness information producing unit produces the first brightness information based on an electric signal converted by a photoelectric converting unit of the pixel when the pixel is the non-color pixel, and produces the first brightness information based on the electric signal converted by the photoelectric converting unit of the pixel and an electric signal converted by photoelectric converting units of the non-color pixels surrounding the pixel when the pixel is the color pixel.

An imaging apparatus according to another aspect of the present invention includes an imaging element having a pixel group that is two-dimensionally-arranged and includes color pixels each having a color separating filter that transmits a specific color; and non-color pixels that do not have the color separating filter; a color signal calculating unit that calculates a color signal of a pixel in the pixel group; and a brightness information producing unit that produces a brightness information of the pixel based on the color signal, wherein the color signal calculating unit calculates the color signal of the pixel based on electric signals converted by photoelectric converting units of the pixel and the color pixels surrounding the pixel when the pixel is the color pixel, and calculates the color signal of the pixel based on the electric signals converted by the photoelectric converting units of the color pixels surrounding the pixel when the pixel is the non-color pixel.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

Figure 1:
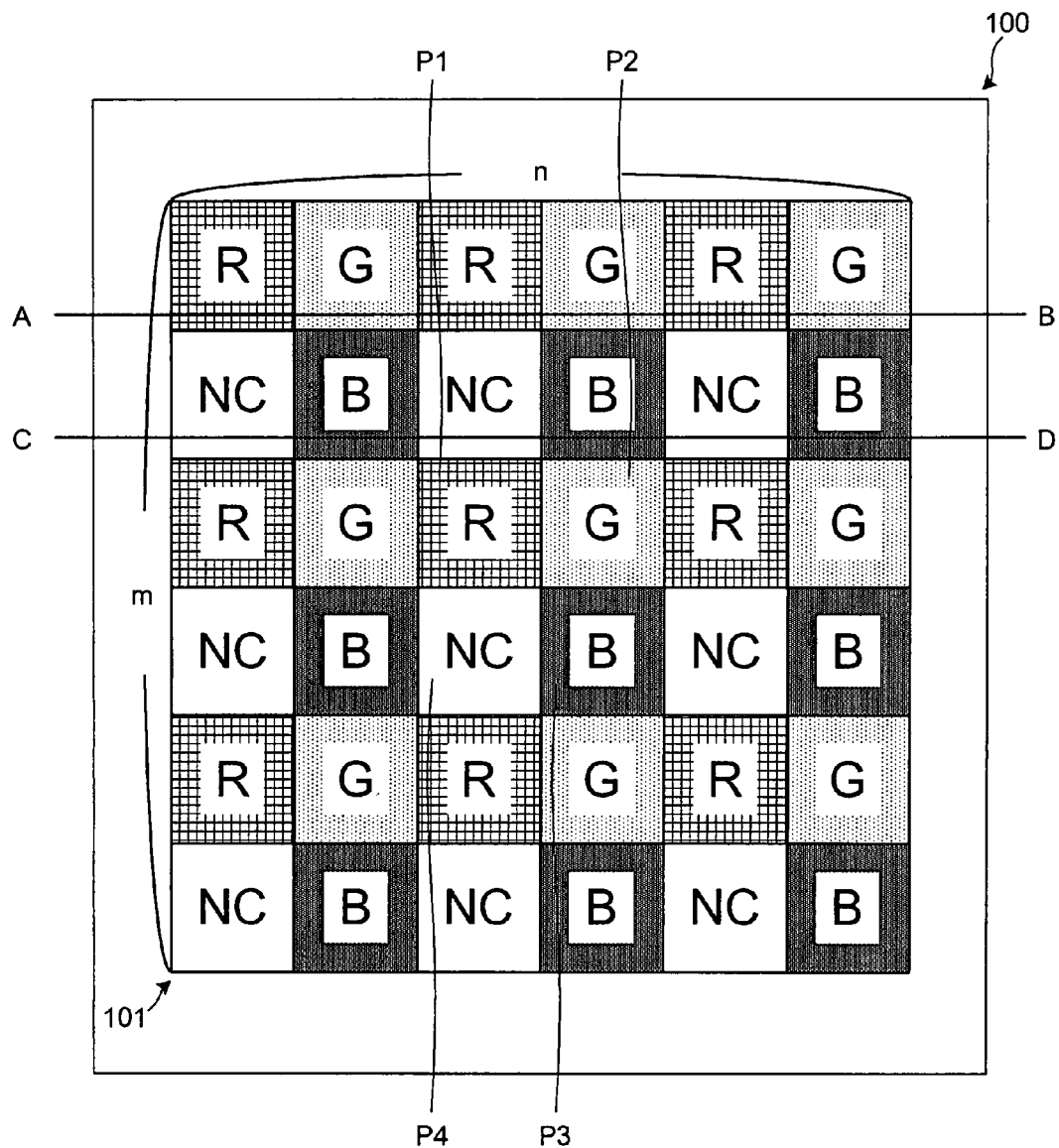
FIG. 1 is a diagram illustrating a two-dimensionally arranged pixel group of an imaging element according to a first embodiment of the present invention.

FIG. 1 is a diagram illustrating a two-dimensionally arranged pixel group of the imaging element according to the first embodiment of the present invention. As illustrated in FIG. 1, an imaging element 100 includes a two-dimensionally arranged pixel group 101 having two-dimensionally arranged pixels each including a photoelectric converting unit such as a photodiode. More specifically, the two-dimensionally arranged pixel group 101 has a pixel arrangement of "m" rows by "n" columns (in FIG. 1, m is six and n is six for simplicity).

In the imaging element 100, the two-dimensionally arranged pixel group 101 has pixels that include a color separating filter (hereinafter, "color pixels"). A color separating filter is a filter that transmits visible light having a specific wavelength and, for example, a red transmitting filter transmits light having a wavelength corresponding to the color of red, a blue transmitting filter transmits light having a wavelength corresponding to the color of blue, and a green transmitting filter transmits light having a wavelength corresponding to the color of green.

In the following description, a color pixel having a red transmitting filter is referred to as "red color pixel R", a color pixel having a green transmitting filter is referred to as "green color pixel G", and a color pixel having a blue transmitting filter is referred to as "blue color pixel B".

In the imaging element, the two-dimensionally arranged pixel group 101 also includes pixels that have no color separating filter (hereinafter, "non-color pixels NC"). Non-color pixels NC may have a transparent filter that transmits all wavelength bands of visible light such as an infrared (IR) cut filter that uses a material that blocks IR rays or a transparent organic material. A transparent insulating layer may be used as the transparent filter.

In a pixel area of an arbitrary two rows by two columns in the two-dimensionally arranged pixel group 101 of the imaging element 100, three pixels of the four pixels constituting the pixel area respectively include a red color pixel R, a green color pixel G, and a blue color pixel B. The remaining pixel is a non-color pixel NC.

Figure 2:
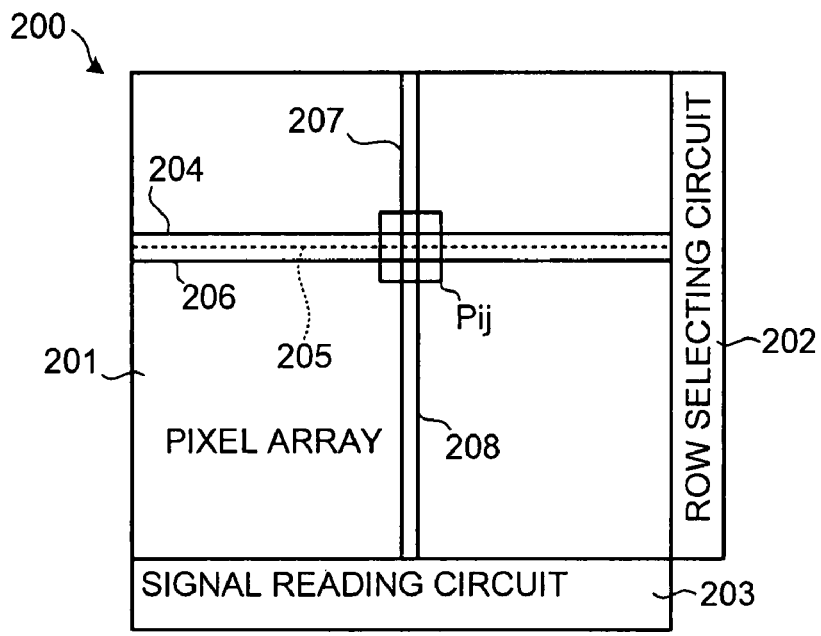
FIG. 2 is a schematic circuit diagram of a 4Tr-active pixel sensor (APS)

Description is given for a configuration of each pixel. The description is given taking an example of a 4Tr-APS, which is a type of complementary metal oxide semiconductor (CMOS) imaging element, as the photoelectric converting unit in the imaging element 100. FIG. 2 is a schematic circuit diagram of the 4Tr-APS. The 4Tr-APS is an imaging element in which a pixel thereof includes four transistors and one photodiode which is a photoelectric converting device.

As illustrated in FIG. 2, a 4Tr-APS 200 includes a pixel array unit 201, a row selecting circuit 202, and a signal reading circuit 203. In the pixel array unit 201, a transferring wire 204, a reset wire 205, and a selection wire 206 are wired for each row in the direction along the row.

In the pixel array unit 201, a reset voltage wire 207 and a signal reading wire 208 are wired for each column in the direction along the column. The 4Tr-APS 200 can select a pixel and read an electric signal from a photodiode in the pixels for each row using the transferring wire 204, the reset wire 205, and a selection wire 206 wired in the direction along the rows.

Figure 3:
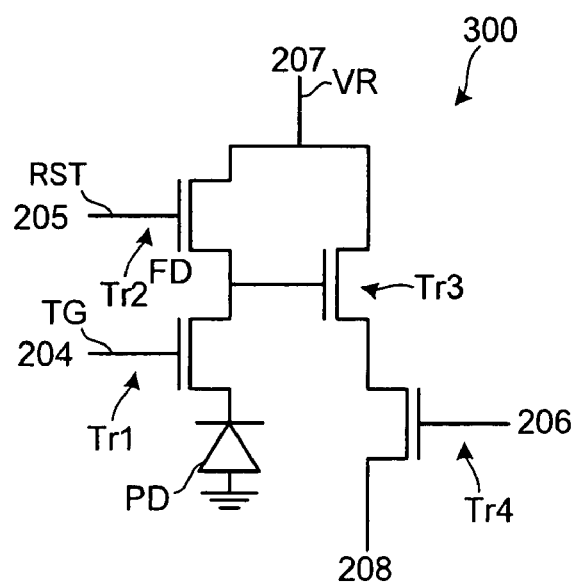
FIG. 3 is a pixel circuit diagram for an arbitrary pixel of the 4Tr-APS shown in FIG. 2.

FIG. 3 is a pixel circuit diagram for an arbitrary pixel of the 4Tr-APS 200 shown in FIG. 2. As illustrated in FIG. 3, a pixel circuit 300 includes four transistors Tr (Tr1 to Tr4) and one photodiode PD.

The photodiode PD includes an n-p junction, executes photoelectric conversion by receiving light from the exterior, and accumulates, in an N-type diffused layer, a signal charge (electron) generated by the photoelectric conversion. The transistor Tr1 includes a transfer gate TG connected to the transferring wire 204 shown in FIG. 2. The transfer gate TG controls the transfer of signal charge from the photodiode PD to a floating diffusion FD. The floating diffusion FD is formed between the transfer gate TG and the transistor Tr2.

The floating diffusion FD is a floating diffused layer between the transfer gate TG and the transistor Tr2, and is connected to a gate of the transistor Tr3. The floating diffusion FD is a capacitor that converts the signal charge transferred from the photodiode PD into a voltage.

The transistor Tr2 is a resetting transistor and includes a reset gate RST connected to the reset wire 205 shown in FIG. 2. The transistor Tr2 resets a voltage of the floating diffusion FD to a reset voltage VR of about 1.5 to 2.0 volts.

The transistor Tr3 is a source follower transistor and outputs a signal voltage corresponding to the voltage of the floating diffusion FD, which varies according to the signal charge. The transistor Tr4 is a row-selecting transistor and is connected to the signal reading wire 208.

The 4Tr-APS 200 is reset by turning on the transfer gate TG, the reset gate RST, and the reset voltage VR. When the transfer gate TG and the reset gate RST are turned off, a signal charge is accumulated in a parasitic capacitor of the photodiode PD.

When an exposure time period is over, the transfer gate TG is turned on and a signal charge proportional to the light received by the photodiode PD is transferred to the floating diffusion FD. When the transistor Tr4 is turned on, the transistor Tr3 is operated and outputs to the signal reading wire 208 an electric signal in proportion to the voltage level of the floating diffusion FD.

Figure 4:
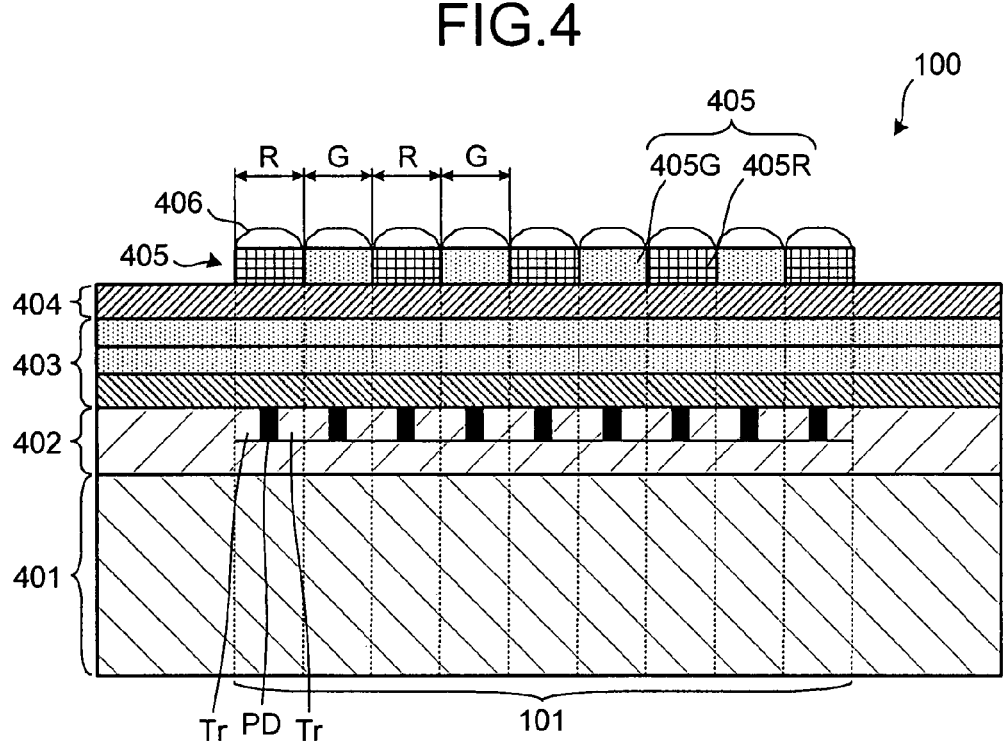
FIG. 4 is a cross-sectional view along A-B of the imaging element shown in FIG. 1.
Figure 5:
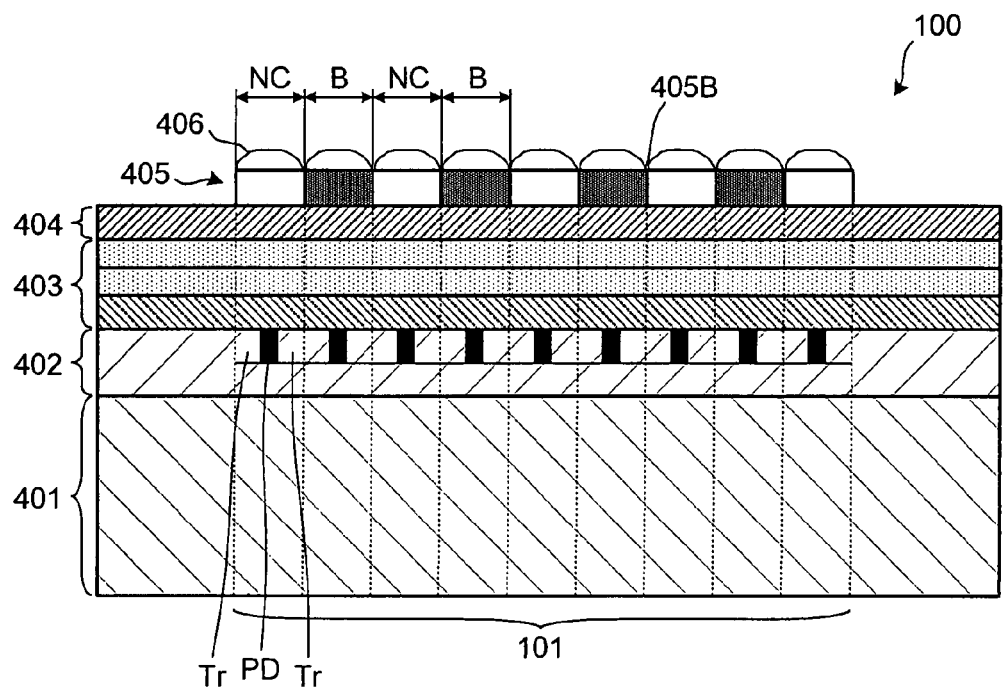
FIG. 5 is a cross-sectional view along C-D of the imaging element shown in FIG. 1.

FIG. 4 is a cross-sectional view along A-B of the imaging element 100 shown in FIG. 1. FIG. 5 is a cross-sectional view along C-D of the imaging element 100 shown in FIG. 1. As illustrated in FIGS. 4 and 5, the imaging element 100 is formed by stacking a silicon substrate 401, a bulk layer 402, and a SiN covering layer 404 that is a transparent insulating layer. A photodiode PD and a transistor Tr are buried in the bulk layer 402. An interlayer insulating film and a wiring metal layer are included in wiring layers 403.

In the pixel array unit 201, each pixel includes a color separating filter 405 and a micro lens 406. In the red color pixel R and the green color pixel G, the color separating filter 405 of the red color pixel R is a red transmitting filter 405R and the color separating filter 405 of the green color pixel G is a green transmitting filter 405G.

Similarly, for the blue color pixel B and the non-color pixel NC shown in FIG. 5, the color separating filter 405 of the blue color pixel B is a blue transmitting filter 405B and the color separating filter 405 of the non-color pixel NC is a transparent filter 405NC that is formed using a transparent resin, etc. An IR cut filter may be used as the transparent filter 405NC.

With this cross-sectional structure, in each of the pixels R, G, B, and NC, external light is transmitted through the micro lens 406, the color separating filter 405 (405R, 405G, 405B, or 405NC), the SiN covering layer 404, and the interlayer insulating film of the wiring layers 403, and is received by the photodiode in the bulk layer 402.

Figure 6:
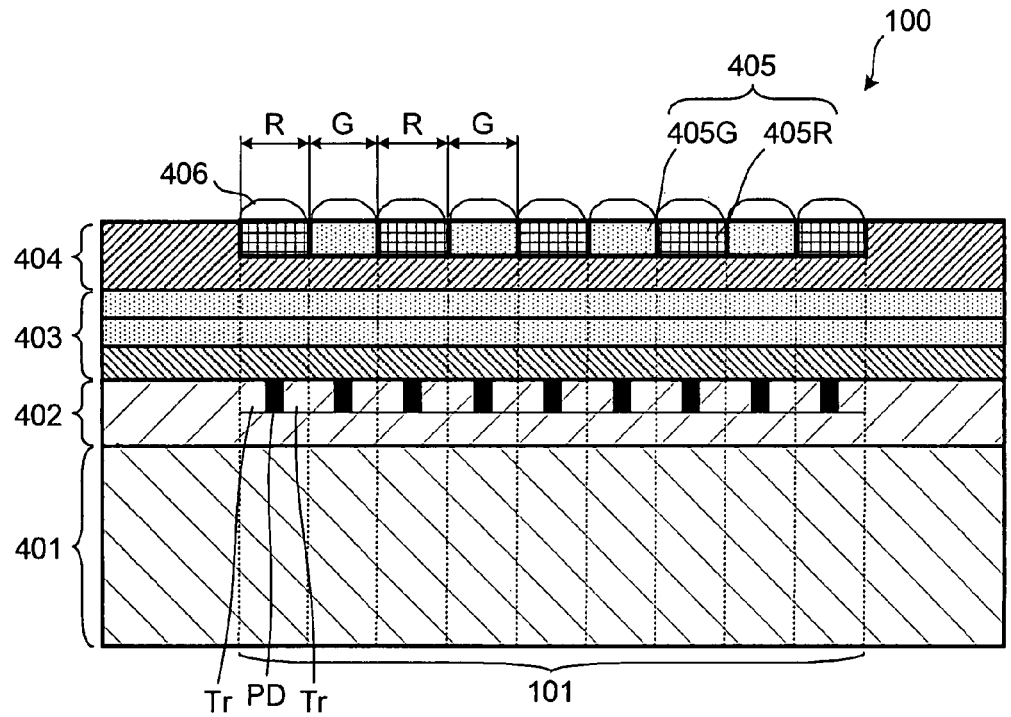
FIG. 6 is a cross-sectional view along A-B of another cross-sectional structure of the imaging element shown in FIG. 1.
Figure 7:
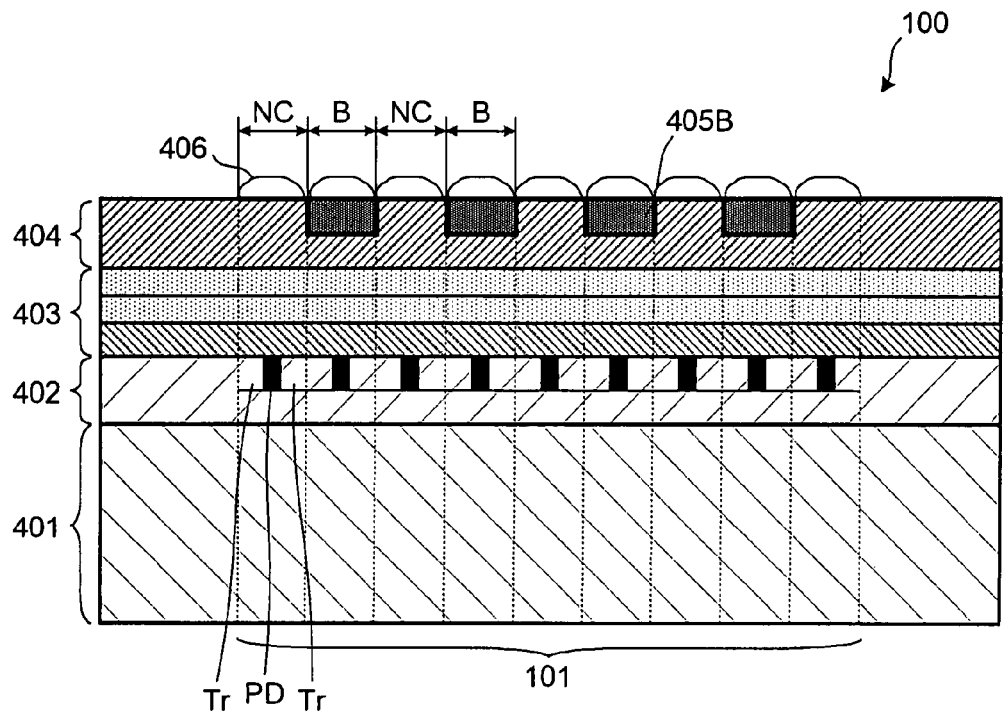
FIG. 7 is a cross-sectional view along C-D of another cross-sectional structure of the imaging element shown in FIG. 1.

FIG. 6 is a cross-sectional view along A-B of another cross-sectional structure of the imaging element 100 shown in FIG. 1, and FIG. 7 is a cross-sectional view along C-D of another cross-sectional structure of the imaging element 100 shown in FIG. 1. Each of the cross-sectional structures shown in FIGS. 6 and 7 is a structure of which only the non-color pixels NC are provided with no color separating filter 405. Components that are the same as those in FIGS. 4 and 5 are given the same reference numerals and description therefor is omitted.

With this cross-sectional structure, in each of the pixels R, G, and B, external light is transmitted through the micro lens 406, the color separating filter 405 (405R, 405G, or 405B), the SiN covering layer 404, and the interlayer insulating film of the wiring layers 403, and is received by the photodiode in the bulk layer 402. In the non-color pixel NC, external light is transmitted through the micro lens 406, the SiN covering layer 404, and the interlayer insulating film of the wiring layers 403, and is received by the photodiode in the bulk layer 402.

FIGS. 8 to 15 are diagrams illustrating the manufacturing steps of the imaging element having a cross-sectional structure shown in FIGS. 6 and 7. A wafer after being formed with the SiN covering layer 404 is prepared.

Figure 8:
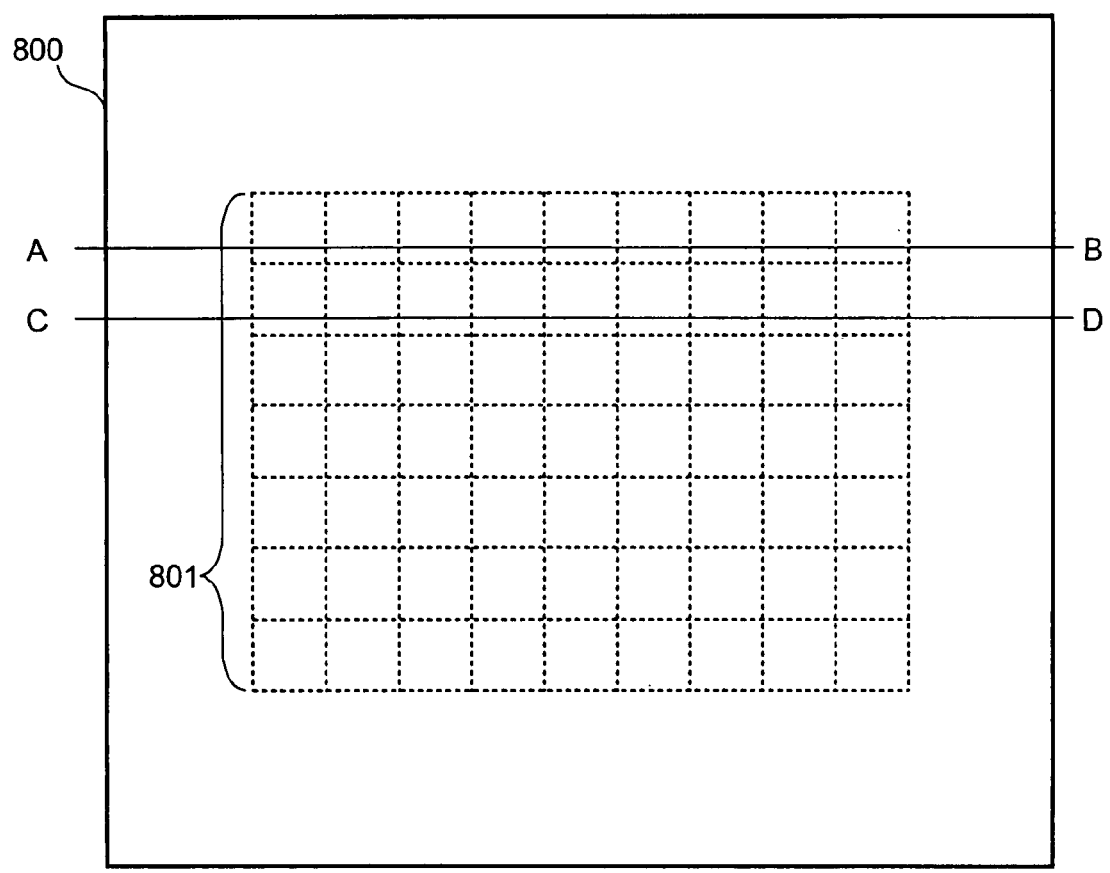
FIG. 8 is a plan view of a wafer after being formed with a silicon nitride (SiN) covering layer.
Figure 9:
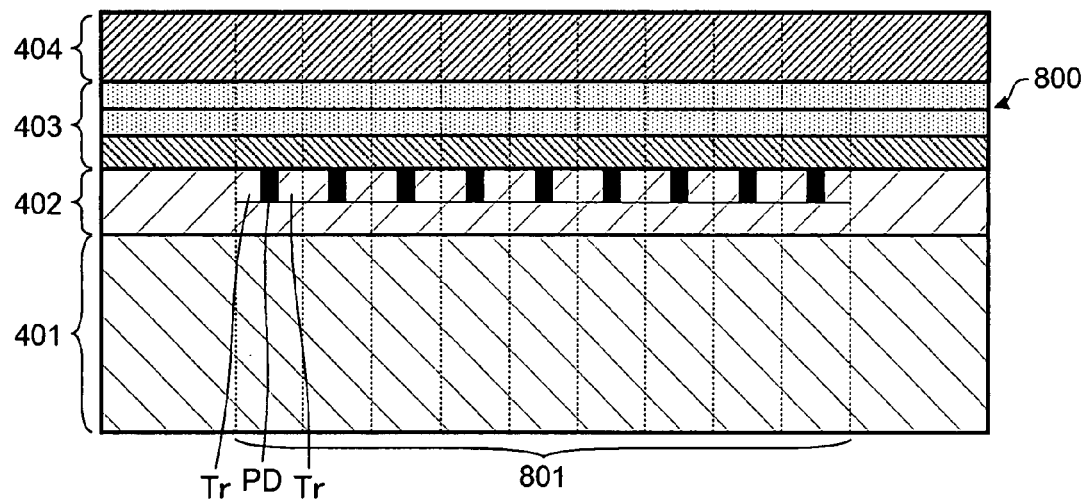
FIG. 9 is a cross-sectional view along A-B of the wafer shown in FIG. 8.
Figure 10:
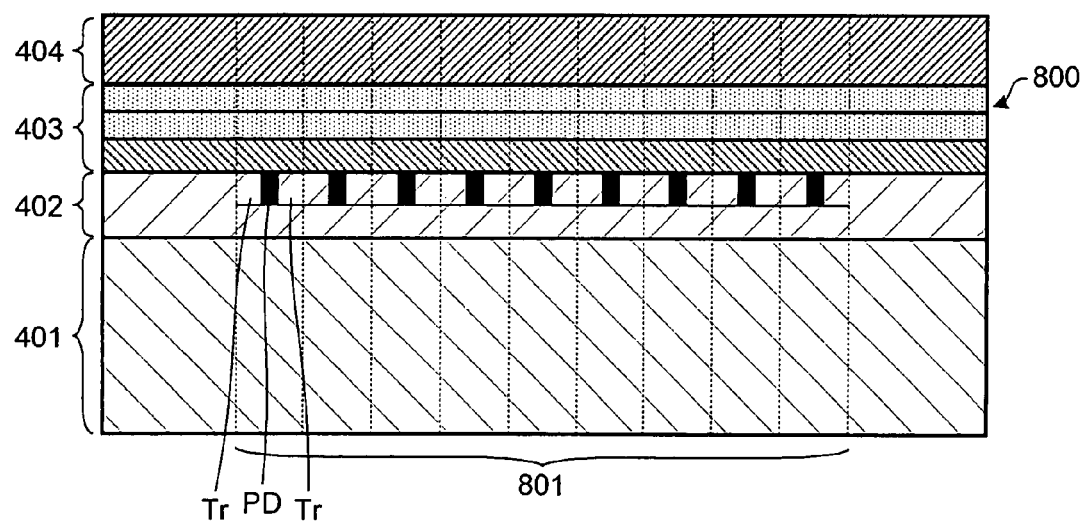
FIG. 10 is a cross-sectional view along C-D of the wafer shown in FIG. 8.

FIG. 8 is a plan view of the wafer after being formed with a SiN covering layer 404. FIG. 9 is a cross-sectional view along A-B of the wafer 800 shown in FIG. 8. FIG. 10 is a cross-sectional view along C-D of the wafer 800 shown in FIG. 8. As illustrated in FIG. 8, the wafer 800 is formed with a pixel array unit 801 that is a two-dimensionally arranged pixel group.

Figure 11:
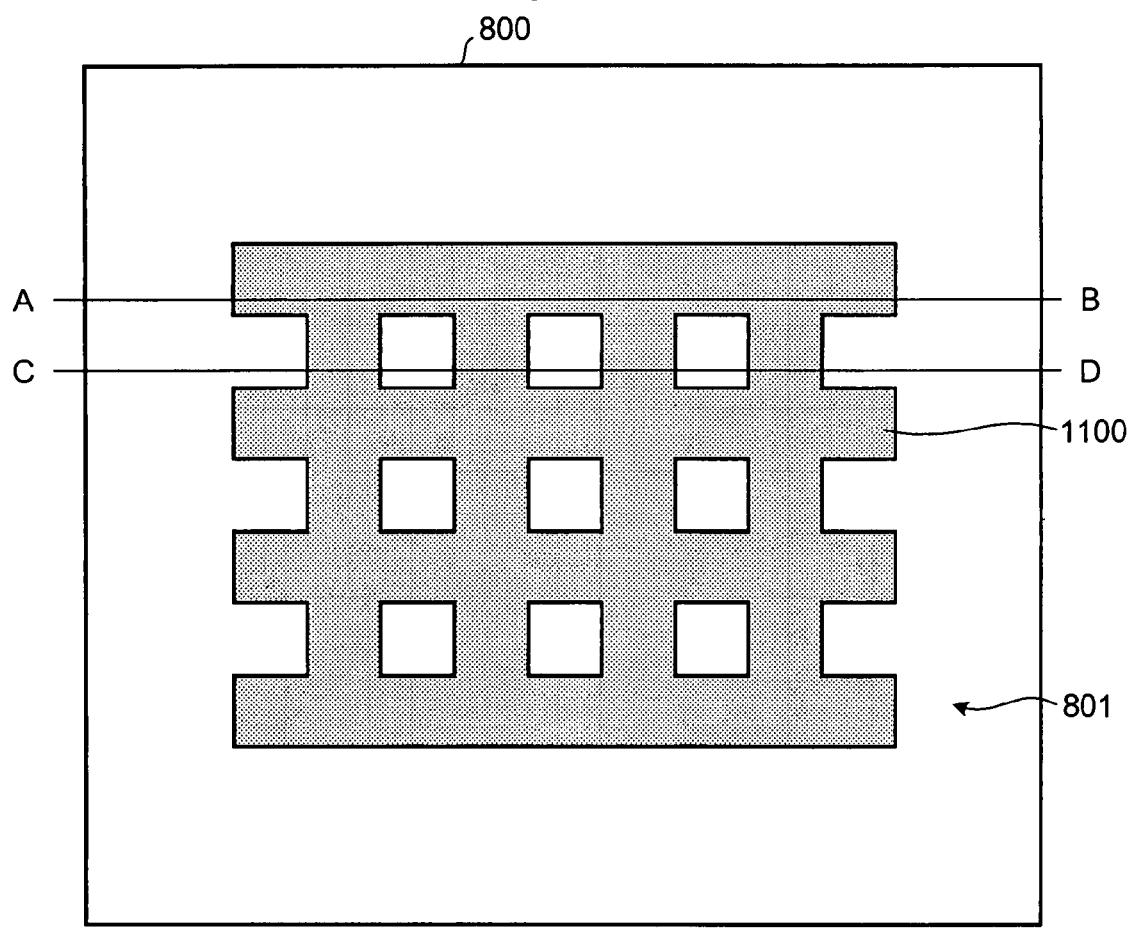
FIG. 11 is a plan view of the wafer after being pattern-etched for the SiN covering layer.
Figure 12:
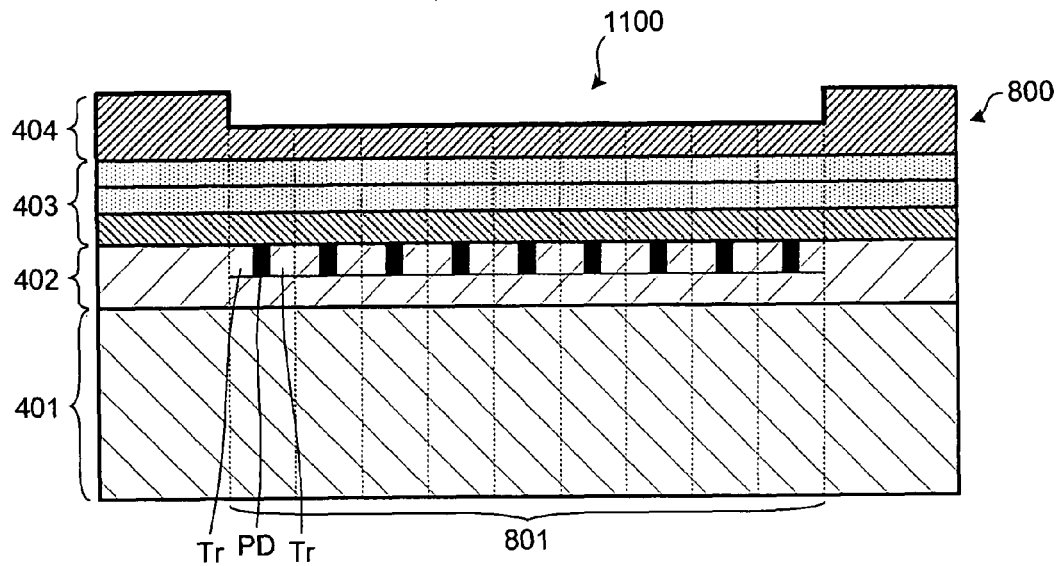
FIG. 12 is a cross-sectional view along A-B of the wafer shown in FIG. 11.
Figure 13:
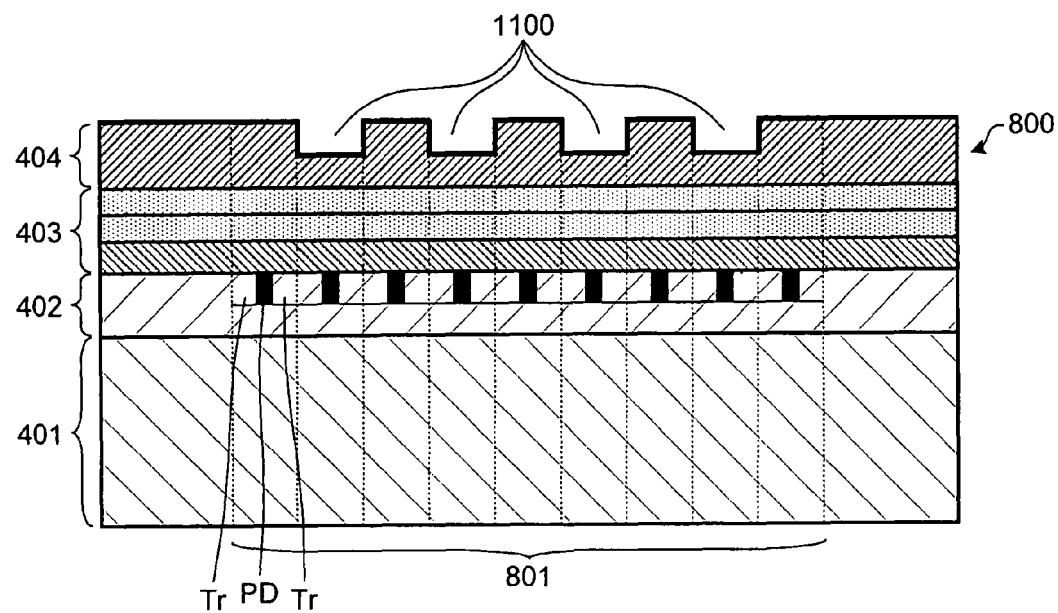
FIG. 13 is a cross-sectional view along C-D of the wafer shown in FIG. 11.

Pixel positions corresponding to positions to form color separating filters 405 in the pixel array unit 801 of the SiN covering layer 404 are etched in, for example, according to a photolithography method. FIG. 11 is a plan view of the wafer 800 after pattern-etching of the SiN covering layer 404. FIG. 12 is a cross-sectional view along A-B of the wafer 800 shown in FIG. 11. FIG. 13 is a cross-sectional view along C-D of the wafer 800 shown in FIG. 11. As illustrated in FIGS. 11 to 13, grooves 1100 are formed in the SiN cover layer 404 by pattern-etching.

Figure 14:
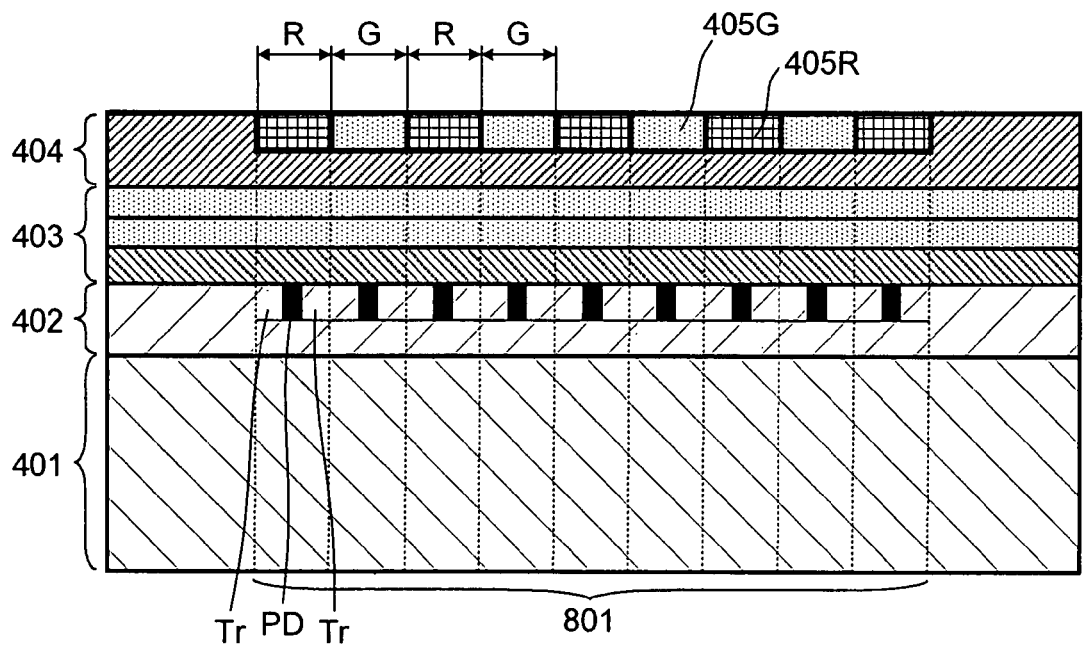
FIG. 14 is a cross-sectional view of the wafer formed with color separating filters in the cross-sectional structure of the wafer shown in FIG. 12.
Figure 15:
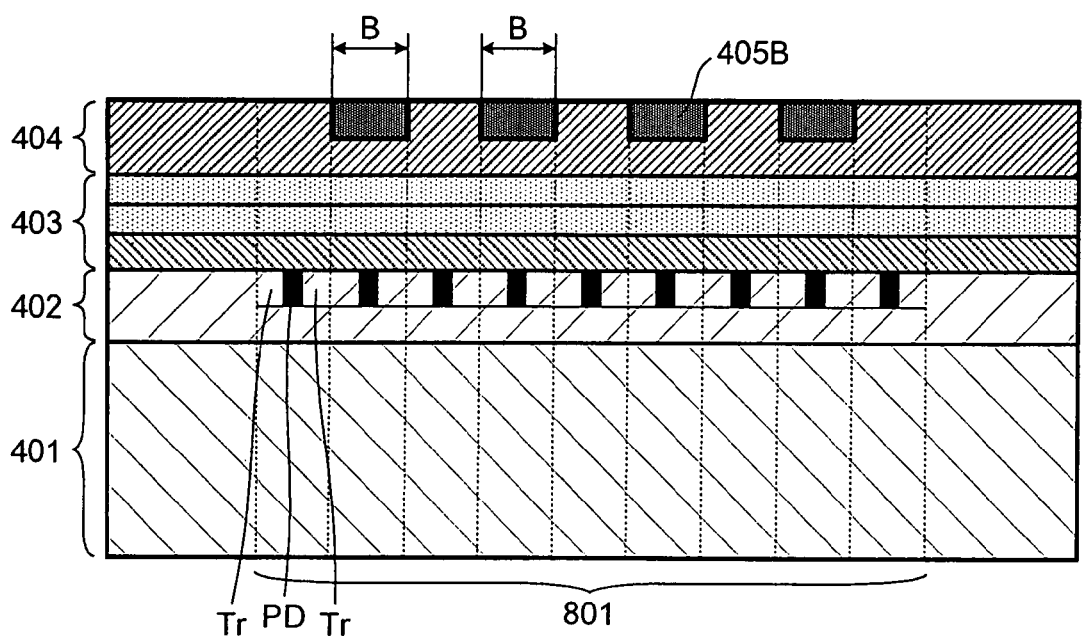
FIG. 15 is a cross-sectional view of the wafer formed with color separating filters in the cross-sectional structure of the wafer shown in FIG. 13.

The color separating filters 405 are formed in the grooves 1100 formed by the pattern-etching. FIG. 14 is a cross-sectional view of the wafer 800 formed with the color separating filters 405 in the cross-sectional structure of the wafer 800 shown in FIG. 12. FIG. 15 is a cross-sectional view of the wafer 800 formed with the color separating filters 405 in the cross-sectional structure of the wafer 800 shown in FIG. 13.

As illustrated in FIG. 14, the red transmitting filters 405R and the green transmitting filters 405G are formed as the color separating filters 405 and, in FIG. 15, the blue transmitting filters 405B are formed as the color separating filters 405.

Finally, the micro lenses 406 are formed on the color separating filters 405 and the portions of the SiN covering layer 404 on which the color separating filters 405 are not formed in the pixel array unit 801. Thereby, as shown in FIGS. 6 and 7, an imaging element that includes no transparent filter 405NC can be manufactured. According to the cross-sectional structure shown in FIGS. 6 and 7, by implementing the etching process that is necessary in the conventional technique, the material for the transparent filter 405NC is unnecessary. Therefore, reduction of the manufacturing cost can be facilitated.

Figure 16:
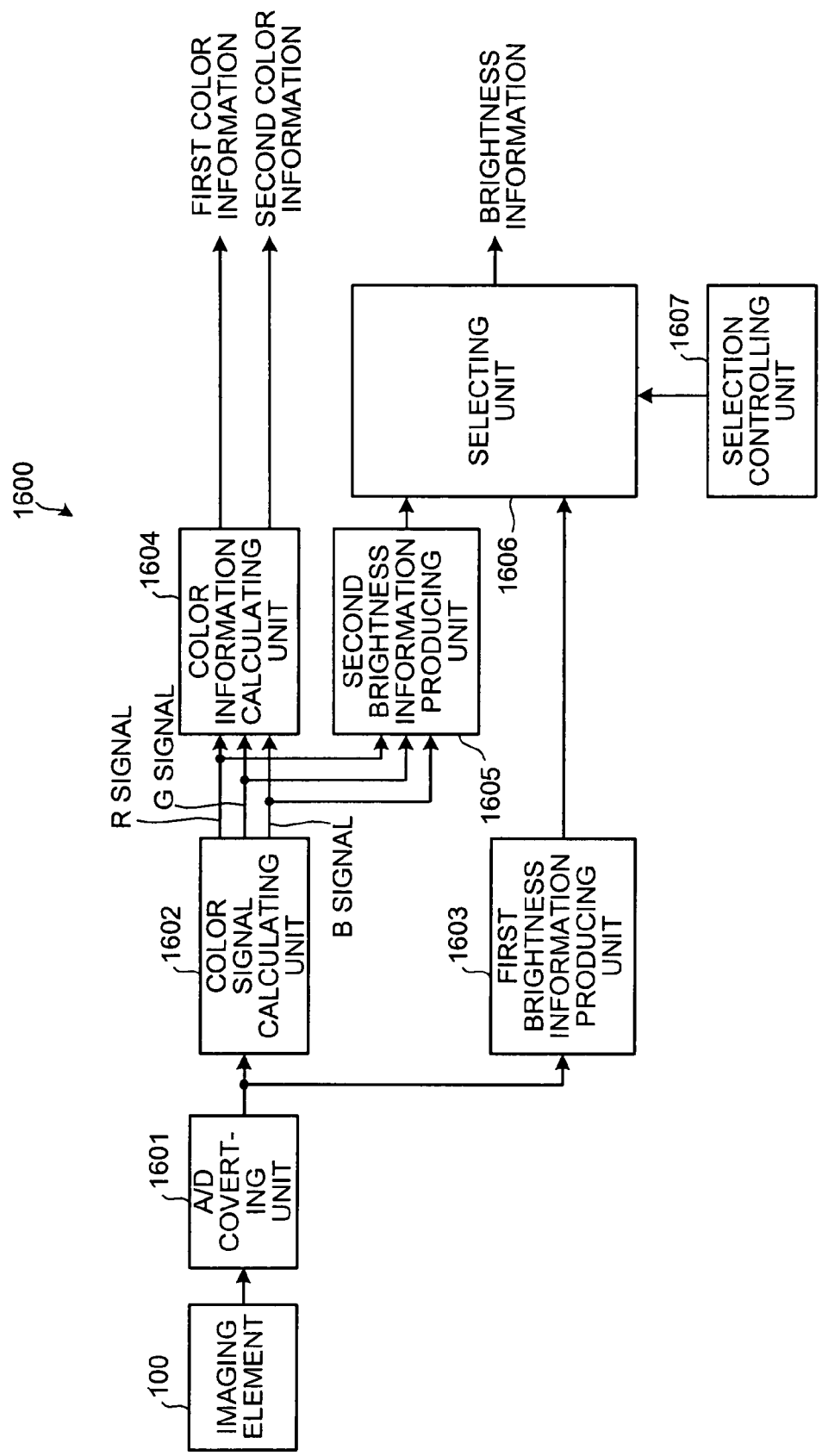
FIG. 16 is a block diagram of an imaging apparatus according to the first embodiment of the present invention.

FIG. 16 is a block diagram of the imaging apparatus according to the first embodiment of the present invention. As illustrated in FIG. 16, an imaging apparatus 1600 includes the imaging element 100, an analog-to-digital (A/D) converting unit 1601, a color signal calculating unit 1602, a first brightness information producing unit 1603, a color information calculating unit 1604, a second brightness information producing unit 1605, a selecting unit 1606, and a selection controlling unit 1607.

As illustrated in FIG. 16, the A/D converting unit 1601 converts electric signals converted by the photoelectric converting units of each of the pixels of the imaging element 100 into digital signals. More specifically, for example, the A/D converting unit 1601 converts each signal into a digital signal in proportion to the voltage level of the floating diffusion FD output from the pixel circuit 300 shown in FIG. 3 to the signal reading wire 208.

The color signal calculating unit 1602 calculates the color signal of an arbitrary pixel (hereinafter, "noted pixel") in the two-dimensionally arranged pixel group 101. More specifically, when the noted pixel is the red color pixel R, the green color pixel G, or the blue color pixel B, the color signal of the noted pixel is calculated based on electric signals converted by the photoelectric converting units of the noted pixel and the surrounding color pixels thereof. When the noted pixel is a non-color pixel NC, the color signal of the noted pixel is calculated based on the electric signals converted by the photoelectric converting units of the color pixels surrounding the noted pixel.

The color signals refer to a signal R, a signal G, and a signal B obtained based on the noted pixel. The color pixels located around the noted pixel may be, for example, color pixels included in eight pixels around the noted pixel or color pixels included in 24 pixels around the noted pixel. The photoelectric converting unit is a unit that converts light received from the exterior into an electric signal and outputs the electric signal and, more specifically, can be realized by, for example, the pixel circuit 300.

With reference to FIG. 1, description is given in detail for a calculating process of color signals when the noted pixel is the red color pixel R, the green color pixel G, or the blue color pixel B. In the description, it is assumed that the pixels in positions around the noted pixel are eight pixels surrounding the noted pixel.

As illustrated in FIG. 1, a signal R of a noted pixel P1 which is the red pixel R is a digital signal value obtained through the A/D converting unit 1601 from the noted pixel P1. A signal G of the noted pixel P1 is the average value of digital signal values respectively obtained from two green pixels G adjacently on the right and the left of the noted pixel P1 through the A/D converting unit 1601. A signal B of the noted pixel P1 is the average value of digital signal values respectively obtained through the A/D converting unit 1601 from four blue pixels B adjacently on the upper-right, the upper-left, the lower-right, and the lower-left of the noted pixel P1.

As illustrated in FIG. 1, a signal R of a noted pixel P2 which is the green pixel G is the average value of digital signal values respectively obtained through the A/D converting unit 1601 from two red pixels R adjacently on the right and the left of the noted pixel P2. A signal G of the noted pixel P2 which is the green color pixel G is a digital signal value obtained through the A/D converting unit 1601 from the noted pixel P2. A signal B of the noted pixel P2 is the average value of digital signal values respectively obtained through the A/D converting unit 1601 from two blue pixels B adjacently above and below the noted pixel P2.

As illustrated in FIG. 1, a signal R of the noted pixel P3 which is a blue pixel B is the average value of digital signal values respectively obtained through the A/D converting unit 1601 from four red pixels R adjacently on the upper-right, the upper-left, the lower-right, and the lower-left of the noted pixel P3. A signal G of the noted pixel P3 which is the blue pixel B is the average value of digital signal values respectively obtained through the A/D converting unit 1601 from two green pixels G adjacently above and below the noted pixel P3. A signal B of the noted pixel P3 which is the blue color pixel B is a digital signal value obtained through the A/D converting unit 1601 from the noted pixel P3.

With reference to FIG. 1, description is given in detail for a calculating process of color signals when the noted pixel is the non-color pixel NC. Similarly, in the description, it is assumed that the pixels in positions around the noted pixel are eight pixels surrounding the noted pixel.

A signal R of a noted pixel P4 which is a non-color pixel NC is the average value of digital signal values respectively obtained through the A/D converting unit 1601 from two red pixels R adjacently above and below the noted pixel P4. A signal G of the noted pixel P4 is the average value of digital signal values respectively obtained through the A/D converting unit 1601 from four green pixels G adjacently on the upper-right, the upper-left, the lower-right, and the lower-left of the noted pixel P4. A signal B of the noted pixel P4 is the average value of digital signal values respectively obtained through the A/D converting unit 1601 from two blue pixels B adjacently on the right and the left of the noted pixel P4.

The first brightness information producing unit 1603 produces the brightness information of an arbitrary pixel (the noted pixel) of the two-dimensionally arranged pixel group 101. Hereinafter, the brightness information produced by the first brightness information producing unit 1603 is referred to as "first brightness information". More specifically, when the noted pixel is a non-color pixel NC, the first brightness information producing unit 1603 calculates the first brightness information based on the electric signals converted by the photoelectric converting unit of the noted pixel.

When the noted pixel is the color pixel, the first brightness information producing unit 1603 calculates the first brightness information based on the electric signals converted by the photoelectric converting unit of the non-color pixels NC located around the noted pixel. The non-color pixels NC located around the noted pixel may be, for example, non-color pixels included in eight pixels surrounding the noted pixel or the non-color pixels NC included in 24 pixels surrounding the noted pixel.

With reference to FIG. 1, description is given in detail for a producing process of the first brightness information obtained when the noted pixel is the non-color pixel NC. In the description, it is assumed that the pixels in positions around the noted pixel are eight pixels surrounding the noted pixel. As illustrated in FIG. 1, brightness information of the noted pixel P4 which is the non-color pixel NC is a digital signal value obtained from the noted pixel P4 through the A/D converting unit 1601.

With reference to FIG. 1, description is given in detail for a producing process of the first brightness information obtained when the noted pixel is the red color pixel R, the green color pixel G, or the blue color pixel B. Similarly, in the description, it is assumed that the pixels in positions around the noted pixel are eight pixels surrounding the noted pixel.

As illustrated in FIG. 1, the first brightness information of the noted pixel P1 which is the red color pixel R is the average value of digital signal values obtained respectively from two non-color pixels NC adjacently above and below the noted pixel P1 through the A/D converting unit 1601. The first brightness information of the noted pixel P2 which is the green pixel G is the average value of digital signal values respectively obtained from four non-color pixels NC adjacently on the upper-right, the upper-left, the lower-right, and the lower-left of the noted pixel P2 through the A/D converting unit 1601. The first brightness information of the noted pixel P3 which is the blue pixel B is the average value of digital signal values respectively obtained from two non-color pixels NC adjacently on the right and the left of the noted pixel P3 through the A/D converting unit 1601.

As illustrated in FIG. 16, the color information calculating unit 1604 calculates color information of the noted pixel based on the color signals calculated by the color signal calculating unit 1602. More specifically, the color information calculating unit 1604 calculates two types of color information (first color information and second color information) by respectively multiplying the color signals, the signal R, the signal G, and the signal B, by parameters concerning the colors and, thereafter, summing the multiplied signal R, the multiplied signal G, and the multiplied signal B.

For example, the color information calculating unit 1604 can calculate two color difference signals as the color information based on the signal R, the signal G, and the signal B. More specifically, when the signal R, the signal G, and the signal B are YUV-converted, a signal U is calculated as the first color information and a signal V is calculated as the second color information. When the signal R, the signal G, and the signal B are YCbCr-converted, a signal Cb is calculated as the first color information and a signal Cr is calculated as the second color information.

The color difference signals can be expressed by a combination of Pb and Pr, a combination of (B-Y) and (R-Y), etc., in addition to the above combinations of U and V and the above combination of Cb and Cr. The parameters concerning the colors and addition of off-set values for the conversion have several variations. The scale of these color difference signals can be adjusted by subtracting the brightness from the blue and the red and using the parameters concerning the colors.

As the methods of expressing color signals, in addition to the RGB and luminance and chrominance, color tones (hue), color values (value), and color saturation (chroma) can be applied. That is, the brightness corresponds to the color value and the two color differences correspond to the chroma and the hue, and those items can be easily converted therebetween. Therefore, for the above color difference signals, the first color information can also be calculated using the hue and the second color information can also be calculated using the chroma.

The second brightness information producing unit 1605 produces the brightness information of the noted pixel based on the color signals calculated by the color signal calculating unit 1602. Hereinafter, the brightness information produced by the second brightness information producing unit 1605 is referred to as "second brightness information". More specifically, the second brightness information producing unit 1605 produces the second brightness information by respectively multiplying the signal R, the signal G, and the signal B calculated by the color signal calculating unit 1602 by predetermined parameters concerning the brightness and, thereafter, by summing the multiplied signal R, the multiplied signal G, and the multiplied signal B.

More specifically, when the signal R, the signal G, and the signal B are YUV-converted, the second brightness information producing unit 1605 produces a signal Y as the second brightness information. Similarly, when those signals are YCbCr-converted, the second brightness information producing unit 1605 produces a signal Y as the second brightness information. When color tones, color values, and color saturation are applied instead of the color difference signals, the color value may be produced as the second brightness information.

Description is given for a detailed calculating approach of a first color information, a second color information, and the brightness information (the first brightness information or the second brightness information) by the above first brightness information producing unit 1603, the color information calculating unit 1604, and the second brightness information producing unit 1605.

The following Equations 1 and 2 are formulas for executing a YUV conversion. Equation 1 expresses the formula for the case where lighting is bright and Equation 2 expresses the formula for the case where lighting is dim.

$$\begin{pmatrix} Y \\ U \\ V \end{pmatrix} = \begin{pmatrix} 0.299 & 0.588 & 0.113 & 0.000 \\ -0.147 & -0.289 & 0.436 & 0.000 \\ 0.345 & -0.289 & -0.056 & 0.000 \end{pmatrix} \times \begin{pmatrix} R \\ G \\ B \\ NC \end{pmatrix} + \begin{pmatrix} 0 \\ 128 \\ 128 \end{pmatrix} \quad (1)$$

$$\begin{pmatrix} Y \\ U \\ V \end{pmatrix} = \begin{pmatrix} 0.000 & 0.000 & 0.000 & 1.000 \\ -0.147 & -0.289 & 0.436 & 0.000 \\ 0.345 & -0.289 & -0.056 & 0.000 \end{pmatrix} \times \begin{pmatrix} R \\ G \\ B \\ NC \end{pmatrix} + \begin{pmatrix} 0 \\ 128 \\ 128 \end{pmatrix} \quad (2)$$

In the above Equations 1 and 2, "Y" is a signal Y (the brightness information) obtained by the YUV conversion. "U" is a color difference signal (the second color information) obtained by the YUV conversion. "Y", "U", and "V" are each eight-bit information here and can respectively take the values of Y=0 to 255, U=0 to 255, and V=0 to 255.

"R" is the signal R calculated by the color signal calculating unit 1602. "G" is the signal G calculated by the color signal calculating unit 1602. "B" is the signal B calculated by the color signal calculating unit 1602. "NC" is the first brightness information (the signal NC) produced by the first brightness information producing unit 1603.

According to Equation 1, the signal Y that is the brightness information obtained when lighting is bright is calculated by multiplying "R", "G", and "B" respectively by the parameters concerning the brightness, "0.299", "0.588", and "0.113" and summing the multiplied values. Because "NC" is multiplied by "0.000", NC is canceled. This signal Y obtained when lighting is bright is produced by the above second brightness information producing unit 1605 as the second brightness information.

The signal U which is the first color information obtained when lighting is bright is calculated by multiplying "R", "G", and "B" respectively by the parameters concerning the color, "−0.147", "−0.289", and "0.436" and summing the multiplied values and an off-set value of "128". Because "NC" is multiplied by "0.000", NC is canceled. This signal U obtained when lighting is bright is produced by the above color information calculating unit 1604 as the first color information.

Similarly, the signal V which is the second color information obtained when lighting is bright is calculated by multiplying "R", "G", and "B" respectively by the parameters concerning the color, "0.345", "−0.289", and "−0.056" and summing the multiplied values and the off-set value of "128". Because "NC" is multiplied by "0.000", NC is canceled. This signal V obtained when lighting is bright is produced by the above color information calculating unit 1604 as the second color information.

According to Equation 2, for the signal Y that is the brightness information obtained when lighting is dim, "NC" is multiplied by "1.000" that is a parameter concerning the brightness. Because "R", "G", and "B" are multiplied by "0.000", "R", "G", and "B" are canceled. That is, the first brightness information produced by the first brightness information producing unit 1603 is directly the signal Y obtained when lighting is dim. Calculation of the signal U and the signal V obtained when lighting is dim is same as that obtained when lighting is bright.

The following Equations 3 and 4 are formulas for executing a YCbCr conversion. Equation 3 expresses the formula for the case where lighting is bright. Equation 4 expresses the formula for the case where lighting is dim.

$$\begin{pmatrix} Y \\ Cb \\ Cr \end{pmatrix} = \begin{pmatrix} 0.256 & 0.504 & 0.098 & 0.000 \\ -0.148 & -0.291 & 0.439 & 0.000 \\ 0.439 & -0.367 & -0.072 & 0.000 \end{pmatrix} \times \begin{pmatrix} R \\ G \\ B \\ NC \end{pmatrix} + \begin{pmatrix} 16 \\ 128 \\ 128 \end{pmatrix} \quad (3)$$

$$\begin{pmatrix} Y \\ Cb \\ Cr \end{pmatrix} = \begin{pmatrix} 0.000 & 0.000 & 0.000 & 1.000 \\ -0.148 & -0.291 & 0.439 & 0.000 \\ 0.439 & -0.367 & -0.072 & 0.000 \end{pmatrix} \times \begin{pmatrix} R \\ G \\ B \\ NC \end{pmatrix} + \begin{pmatrix} 16 \\ 128 \\ 128 \end{pmatrix} \quad (4)$$

In the above Equations 3 and 4, "Y" is the signal Y (the brightness information) obtained by a YCbCr conversion. "Cb" is a color difference signal (the first color information) obtained by a YCbCr conversion. "Cr" is a color difference signal. (the second color information) obtained by a YCbCr conversion. "Y", "Cb", and "Cr" are each eight-bit information here and can respectively take the values of Y=16 to 235, Cb=16 to 240, and Cr=16 to 240.

Similarly in the case of the above Equations 1 and 2, in Equations 3 and 4, the signal Y is calculated using "R", "G", and "B" when lighting is bright, and the signal Y is calculated using "NC" when lighting is dim.

As illustrated in FIG. 16, the selecting unit 1606 selects brightness information from either the first brightness information produced by the first brightness information producing unit 1603 or the second brightness information produced by the second brightness information producing unit 1605.

The selecting unit 1606 outputs the selected brightness information. For example, when Equations 1 and 2 for executing a YUV conversion are applied, the signal Y is calculated according to Equation 1 and the signal Y is calculated according to Equation 2. The selecting unit 1606 selects and outputs the signal Y calculated according to Equation 1 when lighting is bright, and selects and outputs the signal Y calculated according to Equation 2 when lighting is dim.

As illustrated in FIG. 16, the selection controlling unit 1607 controls the selecting unit 1606 to select brightness information from either the first brightness information or the second brightness information based on exposure information obtained when the imaging element captures a subject. The exposure information can be, for example, a frame rate controlling signal. A frame rate is the number of frames per one second obtained from the two-dimensionally arranged pixel group 101.

Usually, the frame rate is a value that varies corresponding to the amount of light for exposure and is, at maximum, 30 frames/second. However, when the amount of light for exposure is insufficient, the frame rate is reduced because the exposure time needs to be increased. Therefore, assuming that the threshold value of the frame rate is, for example, 15 frames/second, the selection controlling unit 1607 outputs to the selecting unit 1606 a frame rate controlling signal indicating that lighting is bright when the frame rate is equal to or larger than the threshold value, and outputs to the selecting unit 1606 a frame rate controlling signal indicating that lighting is dim when the frame rate is smaller than the threshold value.

The selecting unit 1606 selects the first brightness information when the frame rate controlling signal indicating that lighting is bright is input into the selecting unit 1606, and selects the second brightness information when the frame rate controlling signal indicating that lighting is dim is input into the selecting unit 1606. Description has been given using the frame rate controlling signal as the exposure information. However, even when using a clock switching signal sent from a control circuit (not shown) to the two-dimensionally arranged pixel group 101 of the imaging element 100, the selection control can be executed in the same way as using the frame rate controlling signal.

The above color signal calculating unit 1602, the first brightness information producing unit 1603, the color information calculating unit 1604, the second brightness information producing unit 1605, the selecting unit 1606, and the selection controlling unit 1607 can be realized by a digital signal processor (DSP) or other digital circuits. Though the imaging apparatus 1600 is configured to output the color information as the color difference signal, the chroma signal, and the hue signal, and to output the brightness information as the brightness signal and the color value signal, the imaging apparatus 1600 may be configured to output the signal RGB by executing an RGB conversion.

Figure 17:
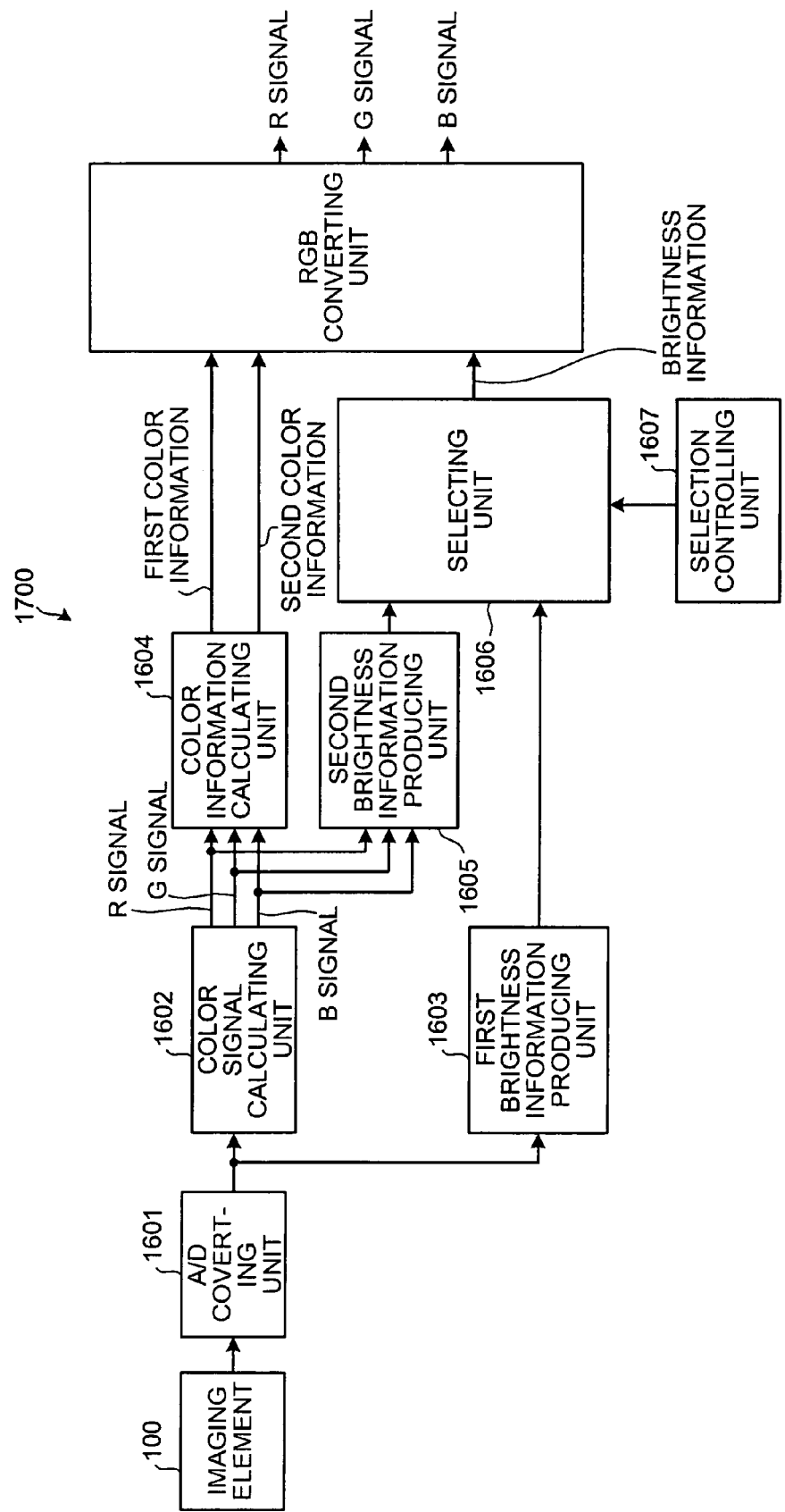
FIG. 17 is a block diagram of an imaging apparatus with an RGB converting unit.

FIG. 17 is a block diagram of an imaging apparatus with an RGB converting unit. In the imaging apparatus 1700, an RGB converting unit 1701 can be input with the first color information and the second color information calculated from the color information calculating unit 1604 and the brightness information produced from the first brightness information producing unit 1603 or the second brightness information producing unit 1605. The imaging apparatus 1700 can perform an RGB conversion on the information, and output the signal R, the signal G, and the signal B.

As described above, according to the first embodiment, the imaging element is configured to transmit the entire visible light region by setting one pixel of four pixels in an arbitrary pixel area of two rows by two columns in the two-dimensionally arranged pixel group, to be a non-color pixel NC. Thereby, the color information (the color difference signal or the hue and the chroma) of the noted pixel can be calculated by supplementing the information from the noted pixel and the color pixels located among the pixels around the noted pixel.

The brightness information of the noted pixel can be calculated by supplementing information from the noted pixel with information from the color pixels located among the pixels around the noted pixel, or by supplementing information from the noted pixel with information of the non-color pixels NC located among the pixels around the noted pixel.

Hence, when lighting is dim, the sensitivity of the imaging element is important because the human eye is sensitive mainly to brightness. Therefore, images having high sensitivity (low light images) can be obtained even when lighting is dim by calculating the brightness information through supplementation mainly from the non-color pixels NC.

When lighting is bright, capturing a subject is possible even when the sensitivity of the imaging element is somewhat lowered. Because the human eye can identify colors well, color information, such as the color difference signal, hue and chroma, is important. Therefore, when lighting is bright, high resolution brightness information can be obtained by calculating the brightness information through supplementation from the color pixels.

As described above, according to the first embodiment, high sensitivity brightness information can be obtained when lighting is dim, and high resolution brightness information can be obtained when lighting is bright. Therefore, images having a high SN-ratio and high image quality at dim points and bright points therein can be obtained. Because the sensitivity when lighting is dim can be improved, the light-receiving area can be reduced to facilitate the same sensitivity and size reduction of each pixel of the imaging element can be facilitated. Hence, the chip size of the imaging element itself can be reduced and support for the shift from larger pixels can be easily realized.

Description is given for an imaging apparatus according to a second embodiment of the present invention. Though the configuration according to the first embodiment is such that the selecting unit 1606 selects and output either brightness information from the first brightness information or the second brightness information, each respectively produced by the first brightness information producing unit 1603 and the second brightness information producing unit 1605, configuration according to the second embodiment is such that either the first brightness information producing unit 1603 or the second brightness information producing unit 1605 is selected prior to the production of the first brightness information and the second brightness information.

According to this configuration, the brightness information is produced by the selected brightness information producing unit and, therefore, production of the brightness information by the other brightness information producing unit that is not used in the image processing can be prevented. Thereby, a reduction in the power consumption can be facilitated.

Because the configuration of the imaging element according to the second embodiment is same as the configuration of the imaging element 100 of the first embodiment and the configuration can be applied to the second embodiment, the description thereof is omitted. For the hardware configuration of the imaging apparatus according to the second embodiment, the same components as those of the imaging apparatus 1600 of the first embodiment shown in FIG. 16 are given the same reference numerals and the description thereof is omitted.

Figure 18:
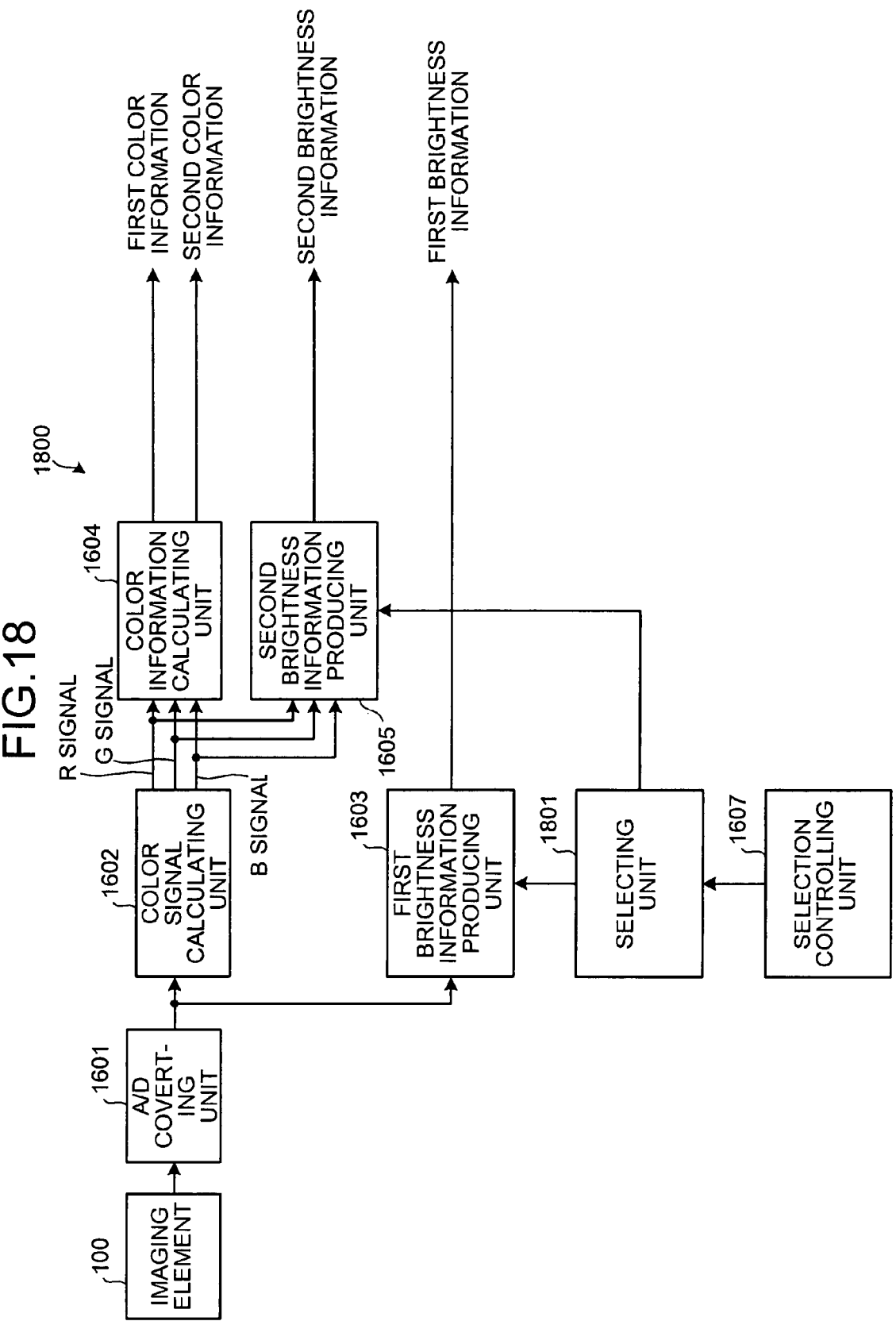
FIG. 18 is a block diagram of an imaging apparatus according to a second embodiment of the present invention.

FIG. 18 is a block diagram of the hardware configuration of the imaging apparatus according to the second embodiment of the present invention. As illustrated in FIG. 18, an imaging apparatus 1800 includes the imaging element 100, the A/D converting unit 1601, the color signal calculating unit 1602, the first brightness information producing unit 1603, the color information calculating unit 1604, the second brightness information producing unit 1605, a selecting unit 1801, and the selection controlling unit 1607.

The selecting unit 1801 selects either the first brightness information producing unit 1603 or the second brightness information producing unit 1605. The selected brightness information producing unit produces the brightness information. The brightness information producing unit can be selected based on the brightness signal from the selection controlling unit 1607.

For example, when Equations 1 and 2 for executing the YUV conversion are applied, either one of Equations 1 or 2 is selected. Using the selected equation, the color difference signals U and V, and the brightness signal Y are calculated. As to the selection of Equations 1 and 2, Equation 1 may be selected when the frame rate controlling signal input from the above selection controlling unit 1607 is a frame rate controlling signal indicating that lighting is bright, and Equation 2 may be selected when the frame rate controlling signal is a frame rate controlling signal indicating that lighting is dim.

Similarly to the imaging apparatus 1700 of the first embodiment, the RGB converting unit 1701 may also be included in this imaging apparatus 1800. Thereby, the RGB converting unit 1701 can be input with the first color information and the second color information calculated from the color information calculating unit 1604 and the brightness information produced from either the first brightness information producing unit 1603 or the second brightness information producing unit 1605. The RGB converting unit 1701 can perform the RGB conversion on the information, and output the signal R, the signal G, and the signal B.

Based on the above, according to the second embodiment, the same actions and effects as those illustrated in the first embodiment can be obtained. Because the brightness information is produced by the selected brightness information producing unit, production of the brightness information by the other brightness information producing unit that is not used in the image processing can be prevented. Therefore, a reduction of the power consumption by the imaging apparatus 1800 can be facilitated.

Description is given for the imaging apparatus according to a third embodiment of the present invention. The configuration according to the first embodiment and the second embodiment is such that judgment is made whether lighting is bright or dim based on the exposure information and, according to the judgment result, to execute the selection of the brightness information and the selection of the brightness information producing unit. However, configuration according to the third embodiment is such that the first brightness information and the second brightness information, corresponding to an increase or decrease in the amount of light for exposure from a subject, are weighted. According to the configuration, the brightness can be varied smoothly corresponding to the brightness of the subject.

The configuration of the imaging element of the third embodiment is same as the configuration of the imaging element 100 of the first embodiment and the configuration can also be applied to the third embodiment and, therefore, the description thereof is omitted. For the hardware configuration of the imaging apparatus according to the third embodiment, the same components as those of the imaging apparatus 1600 of the first embodiment shown in FIG. 16 are given the same reference numerals and the description thereof is omitted.

Figure 19:
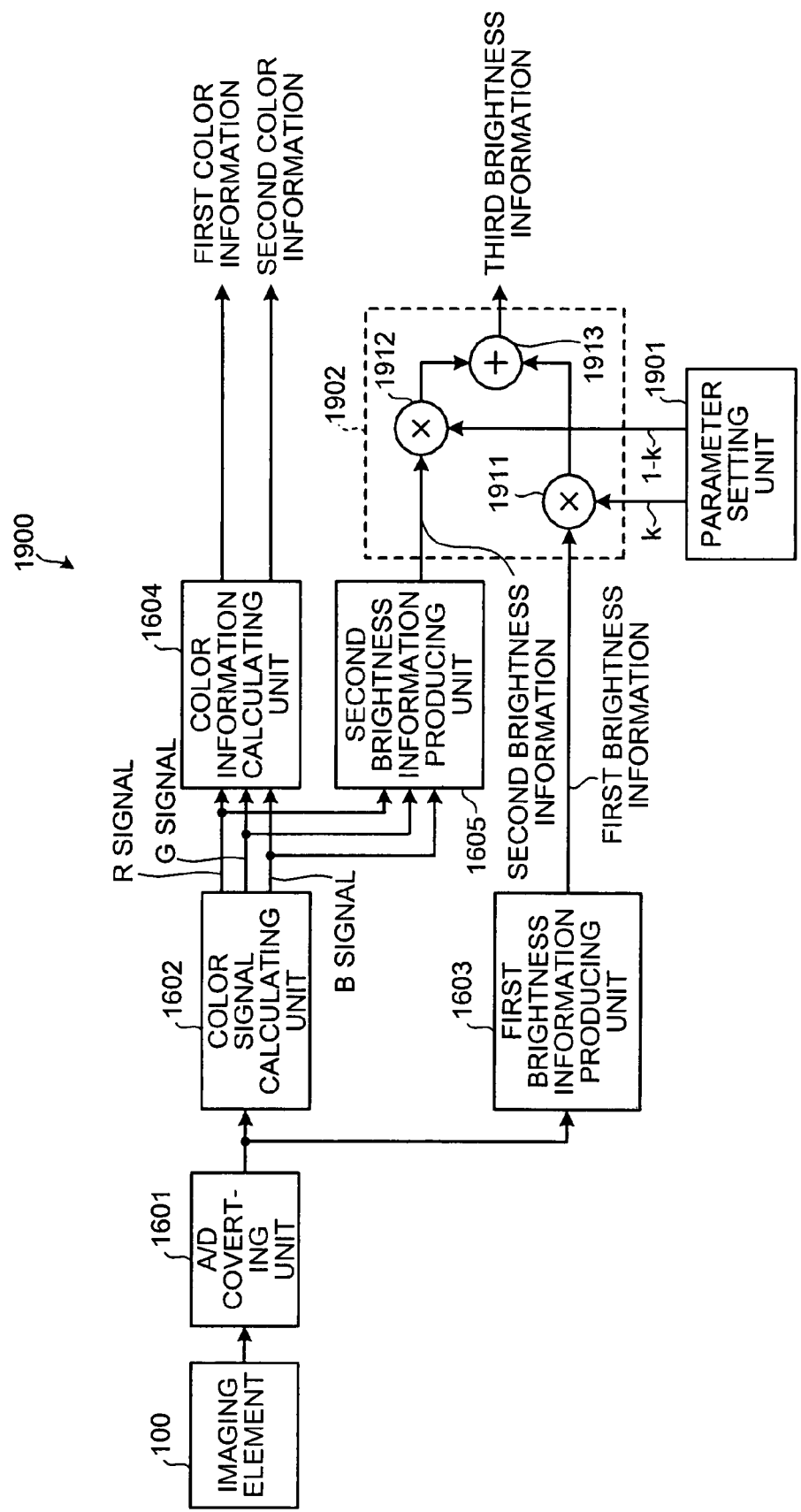
FIG. 19 is a block diagram of an imaging apparatus according to a third embodiment of the present invention.

FIG. 19 is a block diagram of the imaging apparatus according to the third embodiment of the present invention. As illustrated in FIG. 19, an imaging apparatus 1900 is configured by the imaging element 100, the A/D converting unit 1601, the color signal calculating unit 1602, the first brightness information producing unit 1603, the color information calculating unit 1604, the second brightness information producing unit 1605, a parameter setting unit 1901, and a third brightness information producing unit 1902.

Though not shown, similar to the imaging apparatus 1700 shown in FIG. 17, the RGB converting unit 1701 may also be included in the imaging apparatus 1900. Thereby, the RGB converting unit 1701 can be input with the first color information and the second color information calculated from the color information calculating unit 1604 and a third brightness information produced from the third brightness information producing unit 1902. The RGB converting unit 1701 can perform the RGB conversion on the information, and output the signal R, the signal G, and the signal B.

As illustrated in FIG. 19, the parameter setting unit 1901 sets parameters concerning the exposure information obtained when the imaging element captures a subject. The exposure information is information that indicates the amount of light to be exposed to the imaging element and the sensitivity (including the amplifier gain) corresponding to whether the lighting is bright or dim, such as integrated time, circuit gain (the sensitivity controlling signal value), and the degree of aperture adjustment.

A signal value as the result of the measurement of the light amount may be used as the exposure information. A parameter k is a value that represents the degree of the brightness or the dimness corresponding to the exposure information. The parameter k varies as $0 \leq k \leq 1$ and the parameter k represents that lighting is most bright when k is =0, and represents that lighting is most dim when k=1.

Description is given for the case where the integrated time t is used as the exposure information. For example, assuming that the integrated time is represented by "t" second (sec), the integrated time t takes a value as $1/30 \leq t \leq 1/7.5$. The lower limit value of the integrated time t, 1/30 sec corresponds to the case where the parameter k is =0 and the upper limit value of the integrated time t, 1/7.5 sec corresponds to the case where the parameter k is =1. Therefore, the parameter k becomes larger as the integrated time t becomes longer, and the parameter k becomes smaller as the integrated time t becomes shorter. The parameter k may be configured to be calculated from the exposure information. Otherwise, the exposure information and the parameter k may be listed in a table and the value of the parameter k may be configured to be extracted from the table corresponding to the exposure information.

The third brightness information producing unit 1902 produces a new piece of brightness information of the noted pixel (hereinafter, "third brightness information") based on the first brightness information obtained from the first brightness information producing unit 1603, the second brightness information produced by the second brightness information producing unit 1605, and the parameter k set by the parameter setting unit 1901. More specifically, the third brightness information producing unit 1902 is includes two multipliers and one adder.

A first multiplier 1911 multiplies the first brightness information and the parameter k. A second multiplier 1912 executes a multiplying process based on the second brightness information and the parameter k. That is, the second multiplier 1912 multiplies the second brightness information and the value of (1−k). An adder 1913 sums the multiplication result of the first multiplier 1911 and the multiplication result of the second multiplier 1912, and outputs the value as the result of the addition as the third brightness information.

Description is given for a detailed calculation approach for the first color information, the second color information, and the third brightness information by the above first brightness information producing unit 1603, the color information calculating unit 1604, the second brightness information producing unit 1605, and the third brightness information producing unit 1902.

The following Equation 5 is a formula for executing a YUV conversion. Because "T", "U", "V", "R", "C", and "NC" in the following Equation 5 are same as those in the above Equation 1, description thereof is omitted.

$$\begin{pmatrix} Y \\ U \\ V \end{pmatrix} = \begin{pmatrix} 0.299 \cdot (1-k) & 0.588 \cdot (1-k) & 0.113 \cdot (1-k) & k \\ -0.147 & -0.289 & 0.436 & 0.000 \\ 0.345 & -0.289 & -0.056 & 0.000 \end{pmatrix} \times \begin{pmatrix} R \\ G \\ B \\ NC \end{pmatrix} + \begin{pmatrix} 0 \\ 128 \\ 128 \end{pmatrix} \quad (5)$$

For Equation 5, the parameters concerning the brightness are assumed to be "0.299", "0.588", "0.113", and "1". "0.299" is multiplied by (1−k) and "R". "0.588" is multiplied by (1−k) and "G". "0.113" is multiplied by (1−k) and "B". "1" is multiplied by k and "NC".

As described above, according to Equation 5, the signal Y which is the third brightness information can be calculated using "R", "G", and "B" when lighting is bright (i.e., k=0), and using only "NC" when lighting is dim (i.e., k=1). The signal Y which is the third brightness information can be calculated using "R", "G", "B", and "NC" when the parameter k is 0<k<1.

As shown in the above Equation 5, the total of the transmittances respectively of the three colors R, G, B should ideally be one and R+G+B=NC (non-color). However, in the actual manufacture, R G+B≠NC may occur. In this case, when the parameter k is applied to "NC", the optimal image quality can also be obtained by further multiplying a constant α. The formula for this case is the following Equation 6.

$$\begin{pmatrix} Y \\ U \\ V \end{pmatrix} = \begin{pmatrix} 0.299 \cdot (1-k) & 0.588 \cdot (1-k) & 0.113 \cdot (1-k) & \alpha \cdot k \\ -0.147 & -0.289 & 0.436 & 0.000 \\ 0.345 & -0.289 & -0.056 & 0.000 \end{pmatrix} \times \begin{pmatrix} R \\ G \\ B \\ NC \end{pmatrix} + \begin{pmatrix} 0 \\ 128 \\ 128 \end{pmatrix} \quad (6)$$

Based on the above description, according to the third embodiment, the value of the third brightness information can be varied corresponding to the degree of the brightness or dimness and, therefore, the influence of noise can be reduced. That is, when lighting is dim, the voltages of the R, G, and signal Bs are low and, therefore, the amplitudes of the signals R, G, and B are small compared to noise from the photoelectric converting unit which is the pixel circuit 300 shown in FIG. 3 and the periphery circuits thereof. As a result, the sensitivity is lowered.

Therefore, by continuously varying the compensation amount for compensating noise, that is, the parameter k following the increase and decrease of the noise, the noise from the photoelectric converting unit and the periphery circuits thereof can be cancelled and an effect can be exerted that images having more even S/N ratios and high image quality can be obtained. An effect can be exerted that image quality with an S/N ratio that follows the variation of the brightness or the dimness can be obtained especially when the brightness gradually changes such as in the early morning or at dusk.

Description is given for an imaging apparatus according to a fourth embodiment of the present invention. The configuration according to the third embodiment is such that the first brightness information and the second brightness information, corresponding to an increase or the decrease of the amount of light for exposure from a subject, are weighted. In contrast, the fourth embodiment is configured to further weight the first color information and the second information. According to this configuration, the brightness can be varied smoothly corresponding to the degree of brightness or dimness of a subject.

The configuration of the imaging element of the fourth embodiment is same as the configuration of the imaging element 100 of the first embodiment and the configuration can also be applied to the fourth embodiment and, therefore, description thereof is omitted. For the hardware configuration of the imaging apparatus according to the fourth embodiment, the same components as those of the imaging apparatus 1600 of the first embodiment shown in FIG. 16 are given the same reference numerals and the description thereof is omitted.

Figure 20:
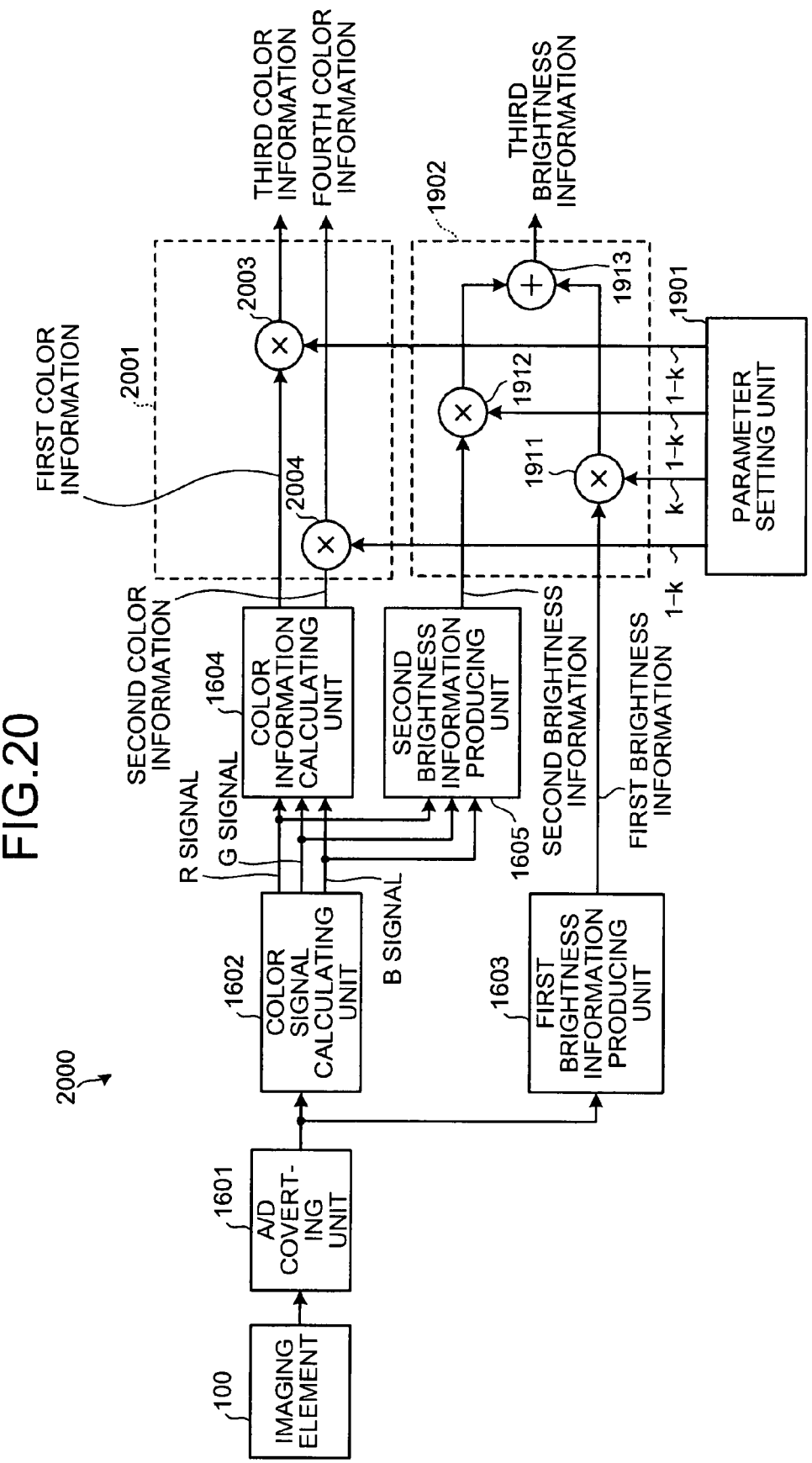
FIG. 20 is a block diagram of an imaging apparatus according to a fourth embodiment of the present invention.

Description is given for the hardware configuration of the imaging apparatus according to the fourth embodiment of the present invention. FIG. 20 is a block diagram of the imaging apparatus according to the fourth embodiment of the present invention. As illustrated in FIG. 20, an imaging apparatus 2000 is configured by the imaging element 100, the A/D converting unit 1601, the color signal calculating unit 1602, the first brightness information producing unit 1603, the color information calculating unit 1604, the second brightness information producing unit 1605, the parameter setting unit 1901, the third brightness information producing unit 1902, and a color information producing unit 2001.

Though not shown, similar to the imaging apparatus 1700 shown in FIG. 17, the RGB converting unit 1701 may also be included in the imaging apparatus 2000. Thereby, the RGB converting unit 1701 may be input with third color information and fourth color information calculated from the color information producing unit 2001 and the third brightness information produced from the third brightness information producing unit 1902. The RGB converting unit 1701 can apply the RGB conversion to the information, and output the signal R, the signal G, and the signal B.

As illustrated in FIG. 20, the color information producing unit 2001 produces new pieces of color information of the noted pixel (the third color information and the fourth color information) based on the color information (the first color information and the second color information) calculated by the color information calculating unit 1604 and the parameter k set by the parameter setting unit 1901. More specifically, the color information producing unit 2001 includes two multipliers.

A third multiplier 2003 multiplies based on the first color information calculated by the color information calculating unit 1604 and the parameter k and, more specifically, multiplies the first color information and (1−k). The multiplied value is output as the third color information.

A fourth multiplier 2004 multiplies based on the second color information calculated by the color information calculating unit 1604 and the parameter k and, more specifically, multiplies the second color information and (1−k). The multiplied value is output as the fourth color information.

Description is given for a detailed calculation approach for the third color information, the fourth color information, and the third brightness information by the first brightness information producing unit 1603, the color information calculating unit 1604, the second brightness information producing unit 1605, the third brightness information producing unit 1902, and the color information producing unit 2001.

The following Equation 7 is a formula for executing a Yuv conversion. The following Equation 7 is obtained by multiplying the parameters concerning the color in the above Equation 5, "−0.147", "−0.289", "0.436", "0.345", "−0.289", "−0.056" and (1−k). The description for the calculating process that is the same as that of Equation 5 is omitted.

$$\begin{pmatrix} Y \\ U \\ V \end{pmatrix} = \begin{pmatrix} 0.299 \cdot (1-k) & 0.588 \cdot (1-k) & 0.113 \cdot (1-k) & k \\ -0.147 \cdot (1-k) & -0.289 \cdot (1-k) & 0.436 \cdot (1-k) & 0.000 \\ 0.345 \cdot (1-k) & -0.289 \cdot (1-k) & -0.056 \cdot (1-k) & 0.000 \end{pmatrix} \times \begin{pmatrix} R \\ G \\ B \\ NC \end{pmatrix} + \begin{pmatrix} 0 \\ 128 \\ 128 \end{pmatrix} \quad (7)$$

According to Equation 7, one of the parameters concerning the brightness, "−0.147" is multiplied by (1−k) and "R"; another one, "−0.289" is multiplied by (1−k) and "G"; and another one, "0.436" is multiplied by (1−k) and "B". Thereby, the signal U. which is the third color information, can be calculated. One of the parameters concerning the brightness, "0.345" is multiplied by (1−k) and "R"; another one, "−0.289" is multiplied by (1−k) and "G"; and another one, "−0.056" is multiplied by (1−k) and "B". Thereby, the signal V, which is the fourth color information, can be calculated.

As shown for Equation 6, when the parameter k is applied to "NC", the optimal image quality can also be obtained by further multiplying the constant α. The formula for this case is the following Equation 8.

$$\begin{pmatrix} Y \\ U \\ V \end{pmatrix} = \begin{pmatrix} 0.299 \cdot (1-k) & 0.588 \cdot (1-k) & 0.113 \cdot (1-k) & \alpha \cdot k \\ -0.147 \cdot (1-k) & -0.289 \cdot (1-k) & 0.436 \cdot (1-k) & 0.000 \\ 0.345 \cdot (1-k) & -0.289 \cdot (1-k) & -0.056 \cdot (1-k) & 0.000 \end{pmatrix} \times \begin{pmatrix} R \\ G \\ B \\ NC \end{pmatrix} + \begin{pmatrix} 0 \\ 128 \\ 128 \end{pmatrix} \quad (8)$$

Based on the above description, according to the fourth embodiment, the actions and effects that are the same as those of the third embodiment can be obtained. When lighting is dim, the human eye becomes sensitive to brightness, but insensitive to color differences. On the other hand, when lighting is dim around the imaging apparatus 2000, the signals output from the pixel circuits 300 of the color pixels shown in FIG. 3 become weaker and, therefore, noise increases and the S/N ratio of the color difference signal is lowered.

Therefore, by intentionally weakening the color difference signal superimposed with a large amount of noise, improvement of the S/N ratio for the total signal (especially, the re-converted signal RGB) can be facilitated. Even when the color difference signal is weakened, the human eye can not perceive the difference and therefore, the difference is not obvious. As a result, improvement of the image quality for the human eye when lighting is dim can be facilitated.

Figure 21:
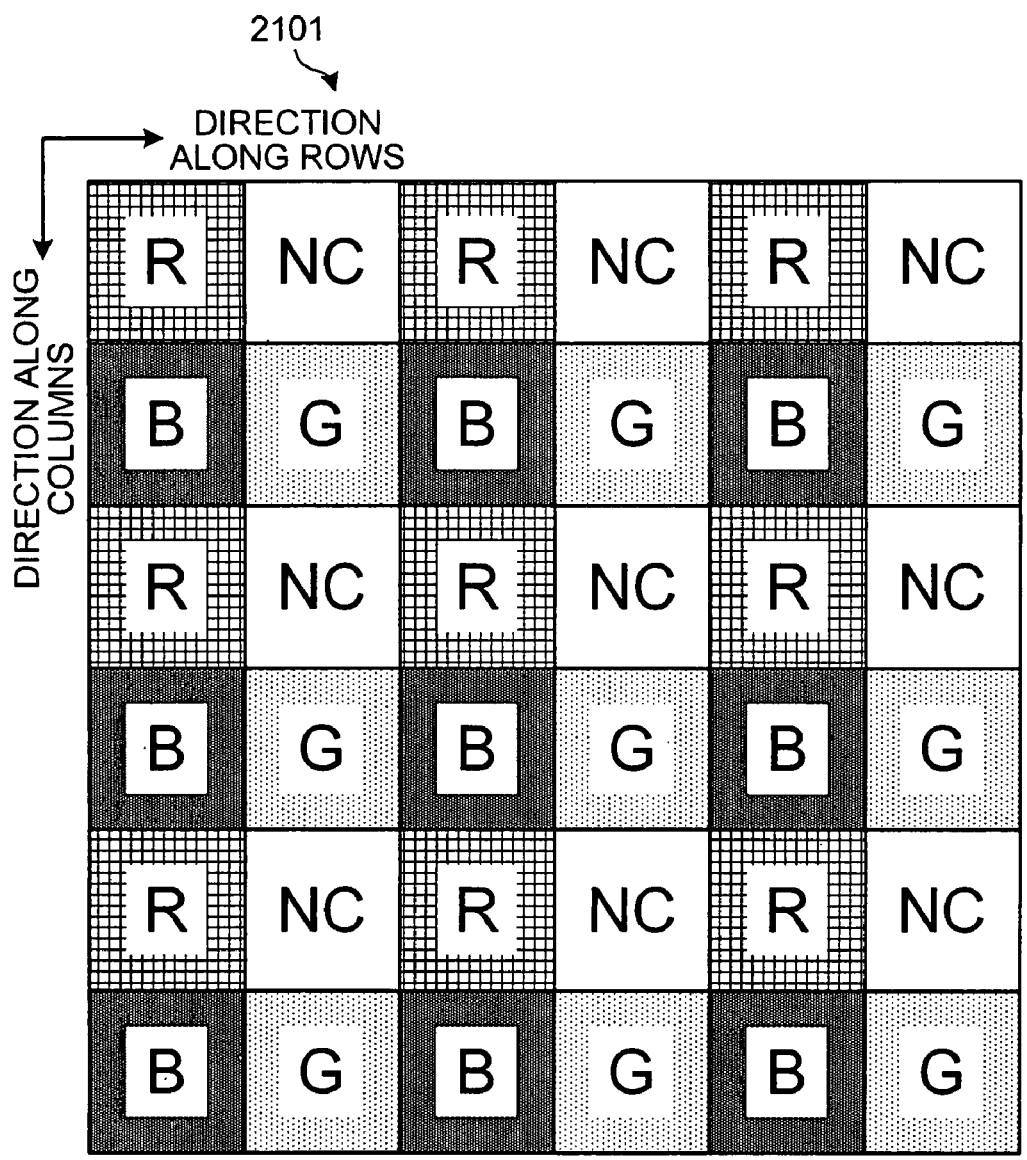
FIG. 21 is a diagram illustrating a two-dimensionally arranged pixel group of an imaging element according to a fifth embodiment of the present invention.

Description is given for a fifth embodiment of the present invention. The fifth embodiment concerns the pixel arrangement of the imaging element. As shown in FIG. 1, the imaging element 100 according to the first embodiment (including the imaging elements applied to the second to the fourth embodiments) is configured to have the red color pixels R and the non-color pixels NC arranged alternately in the direction along columns (the vertical direction in the figure) and the green color pixels G and the blue color pixels B arranged alternately in the output direction. However, the pixel arrangement according to the fifth embodiment is altered in the direction along the column corresponding to the transmittances of the pixels. FIG. 21 is a diagram illustrating a two-dimensionally arranged pixel group of an imaging element according to the fifth embodiment of the present invention.

As illustrated in FIG. 21, of the color pixels (the red color pixels R, the green color pixels G, and the blue color pixels B) and the non-color pixels NC constituting a two-dimensionally arranged pixel group 2101, the red color pixels R and the blue color pixels B that have low transmittances are arranged alternately in a same row. The green color pixels G and the non-color pixels NC that have higher transmittances relative to the red color pixels R and the blue color pixels B are also arranged alternately in a same row.

That is, when the imaging element is the 4Tr-APS 200 shown in FIG. 2, the output direction is the direction of wiring of the signal reading wire 208. In other words, the red color pixels R and the blue color pixels B are arranged such that the output routes of the electric signals respectively obtained from the red color pixels R and the blue color pixels B are in the same direction. Similarly, the green color pixels G and the non-color pixels NC are arranged in the same direction as the arrangement direction of the red color pixels R and the blue color pixels B. Therefore, in FIG. 21, the direction along the columns is the output direction of the electric signals obtained from the pixels.

When the imaging element is a charge coupled device, the output direction is either a charge transferring direction that is in the direction along rows or a charge transferring direction that is in the direction along columns in the two-dimensionally arranged pixel group. The imaging element according to the fifth embodiment can be applied to the imaging apparatuses 1600, 1700, 1800, 1900, and 2000 of the first to the fourth embodiments and conventional imaging apparatuses.

According to the fifth embodiment, the non-color pixels NC and the green color pixels G that have higher transmittances than that of the red color pixels R and the blue color pixels B can be arranged in the same pixel column. For the non-color pixels NC and the green color pixels G that have high transmittances, occurrence of photo-electric charge, that is, the electric signals obtained from the pixel circuits 300 shown in FIG. 3 are relatively higher than the electric signals obtained from the red color pixels R and the blue color pixels B. Therefore, by arranging the non-color pixels NC and the green color pixels G, and the red color pixels R and the blue color pixels B in different columns, enhancement and weakening of the signals can be suppressed in each pixel column. Therefore, a reduction of cross-talk can be facilitated.

Figure 22:
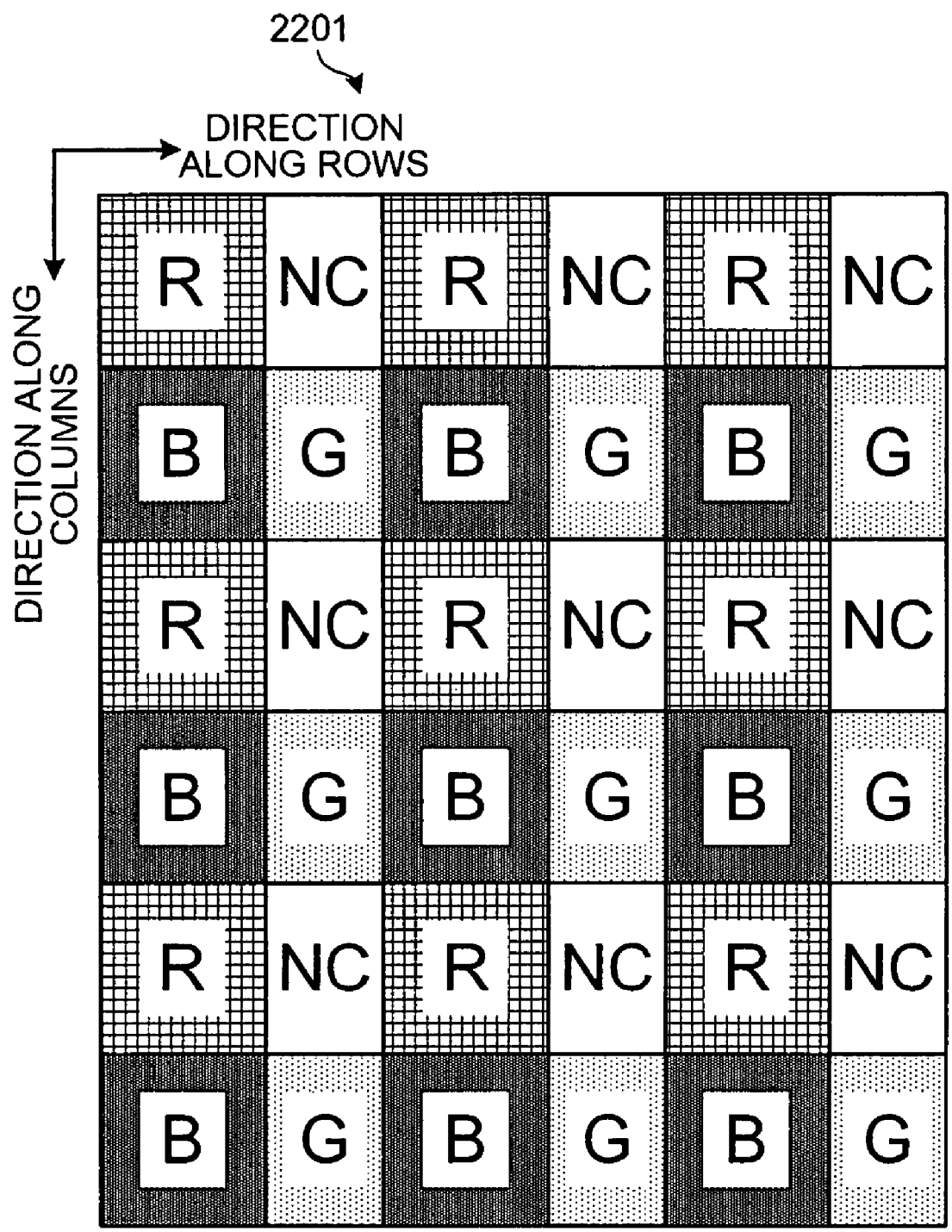
FIG. 22 is a diagram illustrating a two-dimensionally arranged pixel group of an imaging element according to a sixth embodiment of the present invention.

Description is given for a sixth embodiment of the present invention. The configuration according to the sixth embodiment has the same pixel arrangement as that of the fifth embodiment. However, pixel size differs for each column. FIG. 22 is a diagram illustrating a two-dimensionally arranged pixel group of the imaging element. As illustrated in FIG. 22, the size of pixels in pixel columns into which the non-color pixels NC and the green color pixels G constituting a two-dimensionally arranged pixel group 2201 are arranged is smaller than the size of each pixel in pixel columns into which the red color pixels R and the blue color pixels B are arranged.

The pixel size represents the size of a pixel and, for example, the size of the photodiode PD, the sizes of the micro-lens 406, the color separating filter 405, and the transparent filter 405 NC in the pixel circuit 300 of each pixel shown in FIG. 3 may differ.

More specifically, the photodiode PD, the micro-lens 406, and the transparent filter 405NC of the non-color pixel NC are smaller than the photodiode PD, the micro-lens 406, and the red transmitting filter 405R of the red color pixel R, and are also smaller than the photodiode PD, the micro-lens 406, and the blue transmitting filter 405B of the blue color pixel B.

For the green color pixel G, similarly, the micro-lens 406 and the green transmitting filter 405G of the green color pixel G are smaller than the micro-lens 406 and the red transmitting filter 405R of the red color pixel R, and are also smaller than the micro-lens 406 and the blue transmitting filter 405B of the blue color pixel B. The size of the photodiode PD may be same for all the pixels. The imaging element according to the sixth embodiment can be applied to the imaging apparatuses 1600, 1700, 1800, 1900, and 2000 of the first to the fourth embodiments and conventional imaging apparatuses.

According to the sixth embodiment, the same actions and effects as those of the above fifth embodiment can be exerted. Because the sensitivity of each of the red color pixel R and the blue color pixel B is improved and the sensitivity difference between the non-color pixel NC and the green color pixel G can be reduced, higher sensitivity can be facilitated. In particular, images can be facilitated having a high S/N ratio and high image quality can be obtained even when lighting is dim.

The size of the imaging element itself can be reduced by adjusting the sensitivity of the non-color pixel NC and the green color pixel G to be the same as conventional sensitivity. Therefore, size reduction of the imaging element can be facilitated and, associated with this size reduction, a reduction in manufacturing cost can also be facilitated.

Description is given for a seventh embodiment of the present invention. The configuration according to the sixth embodiment is such that the size of the pixels in the pixel columns into which the non-color pixels NC and the green color pixels G are arranged, is set to be a smaller size than the size of each pixel in the pixel columns into which the red color pixels R and the blue color pixels B are arranged. However, contrary to the sixth embodiment, configuration according to the seventh embodiment is such that the size of the pixels in the pixel columns into which the non-color pixels NC and the green color pixels G are arranged, is set to be a larger size than the size of each pixel in the pixel columns into which the red color pixels R and the blue color pixels B are arranged.

Figure 23:
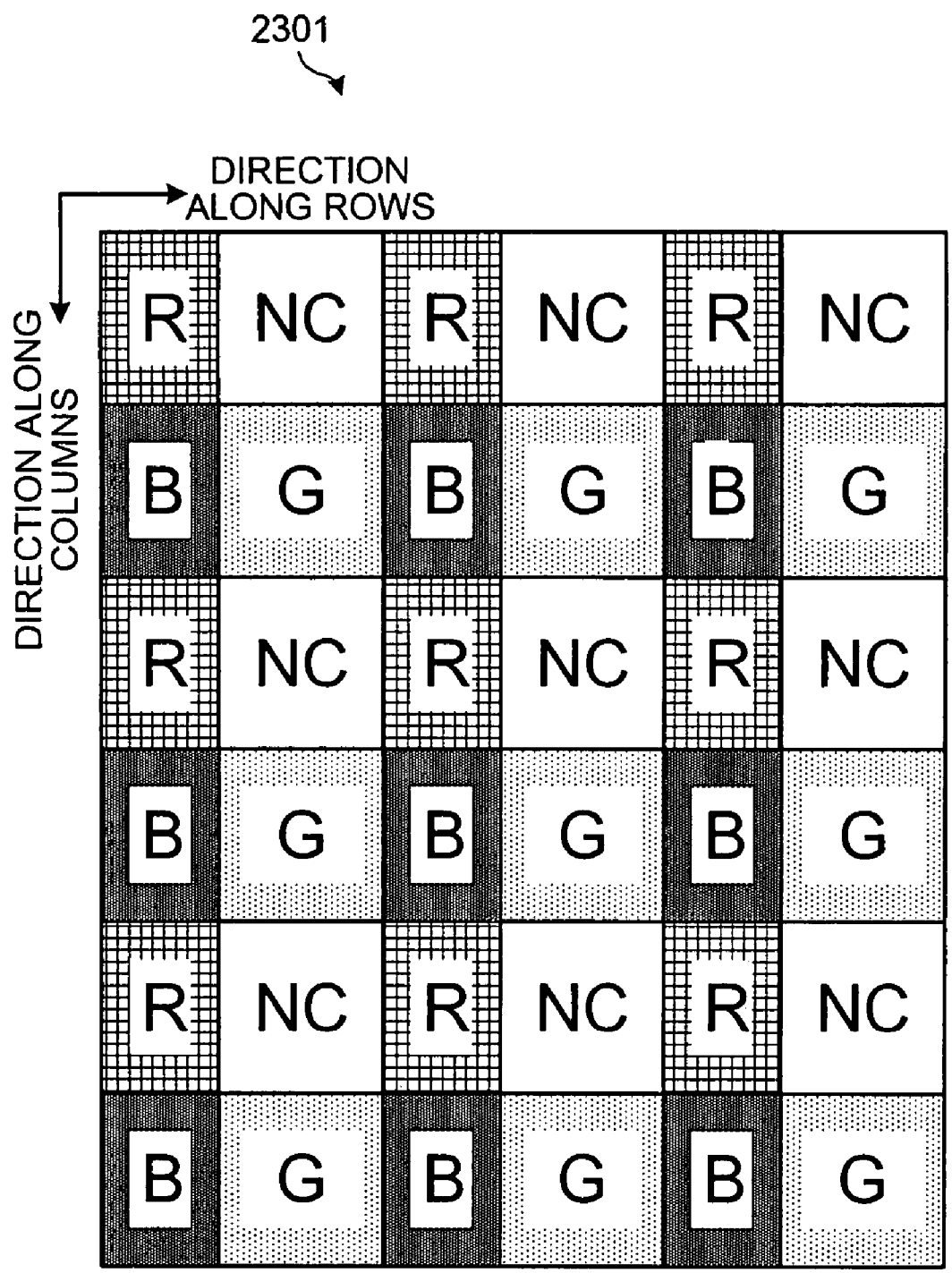
FIG. 23 is a diagram illustrating a two-dimensionally arranged pixel group of an imaging element according to a seventh embodiment of the present invention.

FIG. 23 is a diagram illustrating a two-dimensionally arranged pixel group of an imaging element of the seventh embodiment of the present invention. As illustrated in FIG. 23, the size of pixels in pixel columns into which the non-color pixels NC and the green color pixels G constituting a two-dimensionally arranged pixel group 2301 are arranged, is larger than the size of each pixel in pixel columns into which the red color pixels R and the blue color pixels B are arranged.

The pixel size represents the size of a pixel and, for example, the photodiode PD, the sizes of the micro-lens 406, the color separating filter 405, and the transparent filter 405NC in the pixel circuit 300 of each pixel shown in FIG. 3 may differ.

More specifically, the photodiode PD, the micro-lens 406, and the transparent filter 405NC of the non-color pixel NC are larger than the photodiode PD, the micro-lens 406, and the red transmitting filter 405R of the red color pixel R, and are also larger than the photodiode PD, the micro-lens 406, and the blue transmitting filter 405B of the blue color pixel B.

For the green color pixel G, similarly, the micro-lens 406 and the green transmitting filter 405G of the green color pixel G are larger than the micro-lens 406 and the red transmitting filter 405R of the red color pixel R, and are also larger than the micro-lens 406 and the blue transmitting filter 405B of the blue color pixel B. The size of the photodiode PD may be same for all the pixels.

According to the seventh embodiment, the sensitivity of each of the non-color pixels NC and the green color pixels G is improved and the brightness information obtained when lighting is dim can be improved. Therefore, the brightness information having a high S/N ratio can be obtained even when lighting is dim. In particular, application of the imaging element according to the seventh embodiment is effective in cases in which the brightness information obtained when lighting is dim is important, such as in monitoring cameras.

Size reduction of the imaging element itself can be effected by adjusting the sensitivity of the non-color pixel NC and the green color pixel G to be same as conventional sensitivity. Therefore, size reduction of the imaging element can be facilitated and, associated with this size reduction, a reduction in manufacturing cost can also be facilitated.

Description is given for an eighth embodiment of the present invention. The eighth embodiment concerns the pixel size of an imaging element. The pixel arrangement of an imaging element in the eighth embodiment is same as the pixel arrangement of the imaging element shown in the first embodiment. However, pixel size of the arranged pixels differs. The imaging element according to the eighth embodiment can be applied to the imaging apparatuses 1600, 1700, 1800, 1900, or 2000 in the first to the fourth embodiments.

Figure 24:
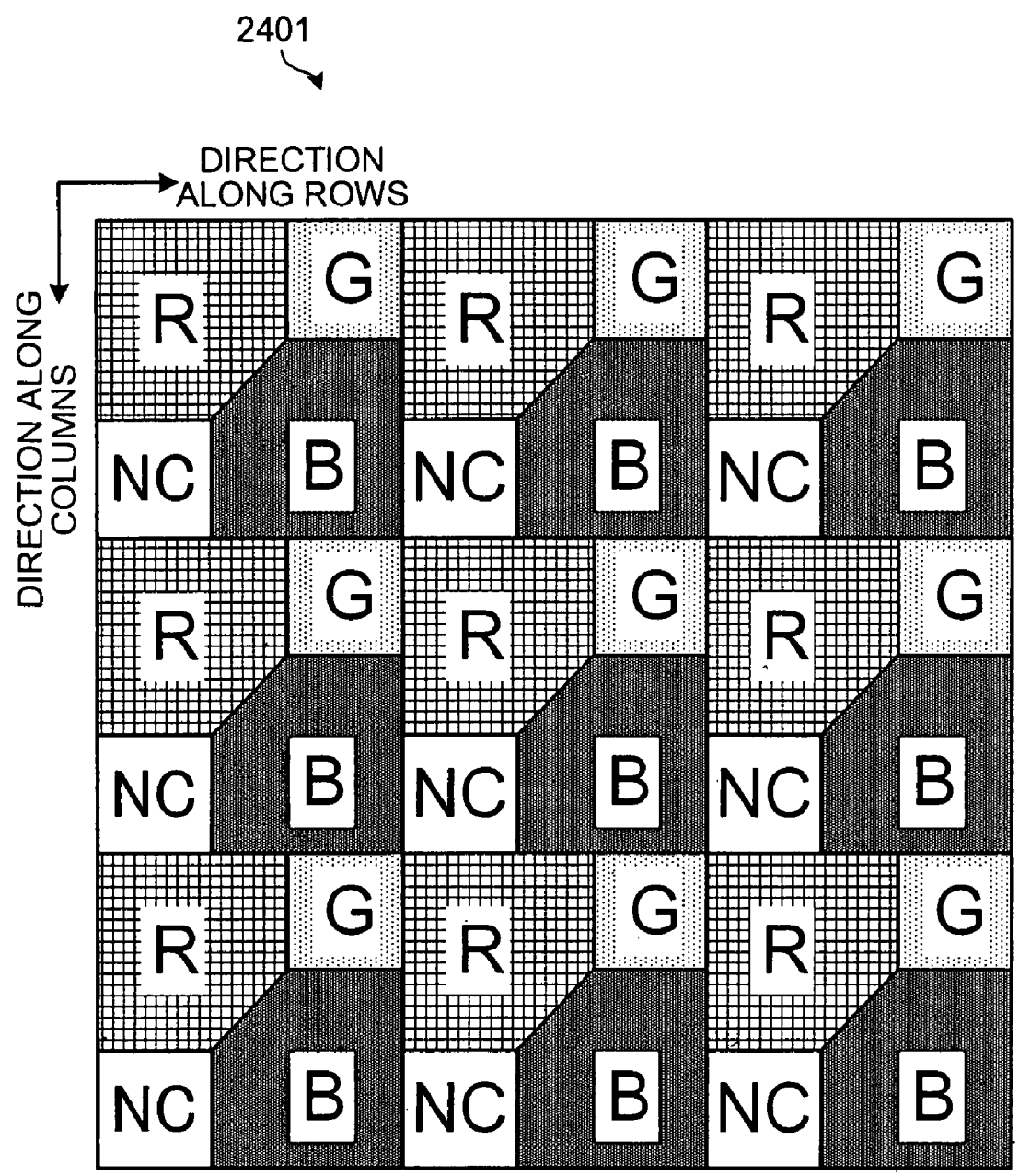
FIG. 24 is a diagram illustrating a two-dimensionally arranged pixel group of an imaging element according to an eighth embodiment of the present invention.

FIG. 24 is a diagram illustrating a two-dimensionally arranged pixel group of the imaging element according to the eighth embodiment of the present invention. As illustrated in FIG. 24, with reference to an arbitrary pixel area of two rows by two columns in a two-dimensionally arranged pixel group 2401, the non-color pixel NC and the green color pixel G are arranged diagonally from each other, and the pixel size of the non-color pixel NC and of the green color pixel G is smaller than the pixel size of the red color pixel R and the blue color pixel B.

The pixel size represents the size of a pixel and, for example, the size of the photodiode PD, the sizes of the micro-lens 406, the color separating filter 405, and the transparent filter 405NC in the pixel circuit 300 of each pixel shown in FIG. 3 may differ.

More specifically, the photodiode PD, the micro-lens 406, and the transparent filter 405NC of the non-color pixel NC are smaller than the photodiode PD, the micro-lens 406, and the red transmitting filter 405R of the red color pixel R, and are also smaller than the photodiode PD, the micro-lens 406, and the blue transmitting filter 405B of the blue color pixel B.

For the green color pixel G, similarly, the micro-lens 406 and the green transmitting filter 405G of the green color pixel G are smaller than the micro-lens 406 and the red transmitting filter 405R of the red color pixel R, and are also smaller than the micro-lens 406 and the blue transmitting filter 405B of the blue color pixel B. The size of the photodiode PD may be same for all the pixels.

According to the eighth embodiment, for the pixel columns consisting of the red color pixels R and the non-color pixels NC, the magnitudes of the electric signals respectively of the red color pixels R and the non-color pixels NC can be made equal by enlarging the pixel size of the red color pixels R which have small transmittance.

Similarly, for the pixel columns consisting of the blue color pixels B and the green pixels G, the magnitudes of the electric signals respectively of the blue color pixels B and the green color pixels G can be made equal by enlarging the pixel size of the blue color pixels B which have small transmittance.

As described above, the electric signals obtained from the pixel columns consisting of the red color pixels R and the non-color pixels NC and the electric signals obtained from the pixel columns consisting of the blue color pixels B and the green color pixels G can be set to be even by enlarging the pixel size of the pixels having small transmittance. Therefore, a reduction of cross-talk can be facilitated. Hence, higher sensitivity can be facilitated and images having a high S/N ratio and high image quality can be obtained even when lighting is dim.

The imaging element itself can be downsized by adjusting the sensitivity of the non-color pixel NC and the green color pixel G to be same as conventional sensitivity. Therefore, downsizing of the imaging element can be facilitated and associated with this downsizing, reduction of the manufacturing cost can also be facilitated.

Description is given for a ninth embodiment of the present invention. Configuration of the pixels according to the ninth embodiment is such that the large size and the small size pixels in the eighth embodiment are switched. The imaging element according to the ninth embodiment can be applied to the imaging apparatuses 1600, 1700, 1800, 1900, and 2000 of the first to the fourth embodiments.

Figure 25:
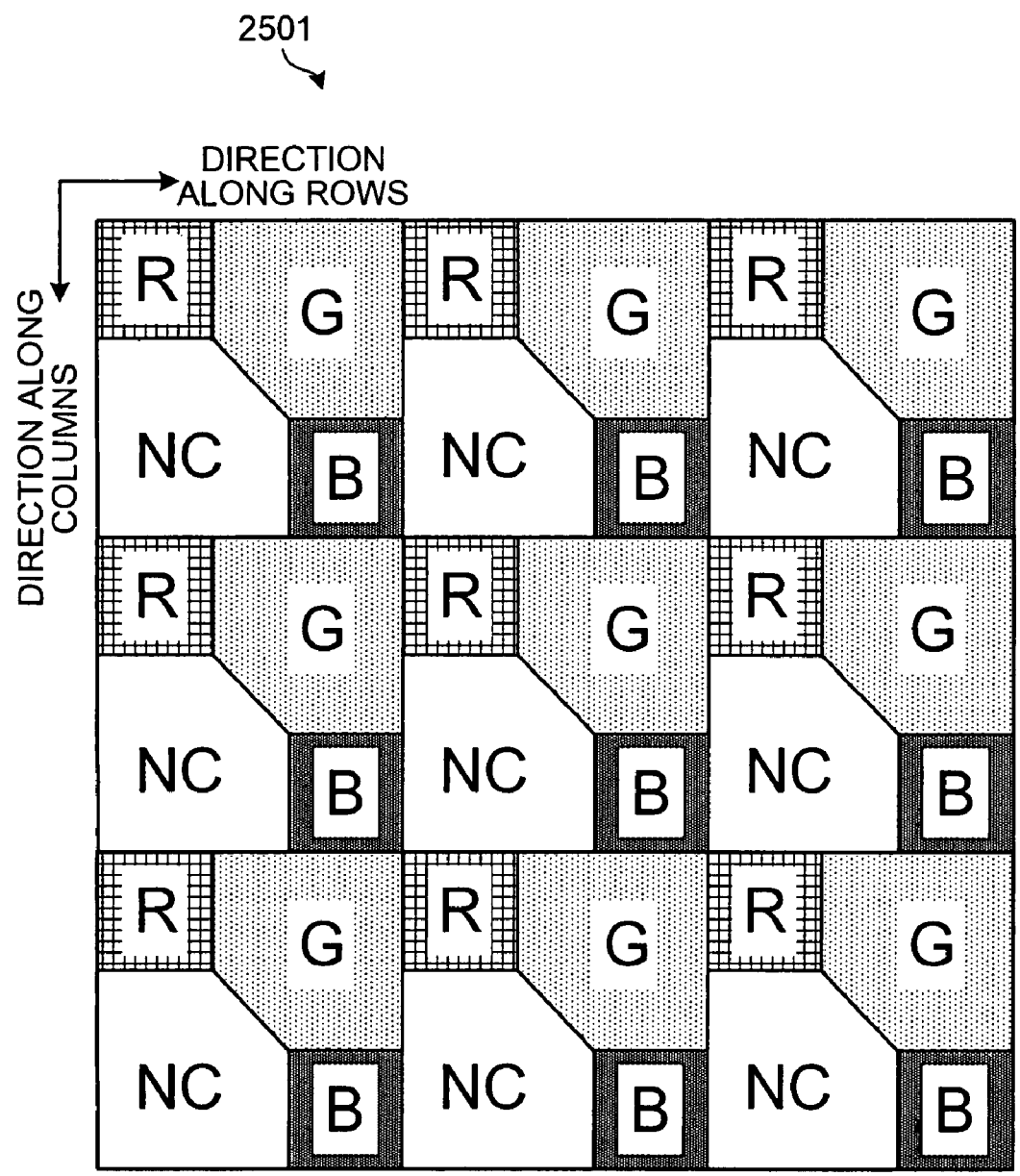
FIG. 25 is a diagram illustrating a two-dimensionally arranged pixel group of an imaging element according to a ninth embodiment of the present invention.

FIG. 25 is a diagram illustrating a two-dimensionally arranged pixel group of the imaging element according to the ninth embodiment of the present invention. As illustrated in FIG. 25, with reference to an arbitrary pixel area of two rows by two columns in a two-dimensionally arranged pixel group 2501, the non-color pixel NC and the green color pixel G are arranged diagonally from each other, and the pixel size of the non-color pixel NC and of the green color pixel G is larger than the pixel size of the red color pixel R and the blue color pixel B.

The pixel size represents the size of a pixel and, for example, the size of the photodiode PD, the sizes of the micro-lens 406, the color separating filter 405, and the transparent filter 405NC in the pixel circuit 300 of each pixel shown in FIG. 3 may differ.

More specifically, the photodiode PD, the micro-lens 406, and the transparent filter 405NC of the non-color pixel NC are larger than the photodiode PD, the micro-lens 406, and the red transmitting filter 405R of the red color pixel R, and are also larger than the photodiode PD, the micro-lens 406, and the blue transmitting filter 405B of the blue color pixel B.

For the green color pixel G, similarly, the micro-lens 406 and the green transmitting filter 405G of the green color pixel G are larger than the micro-lens 406 and the red transmitting filter 405R of the red color pixel R, and are also larger than the micro-lens 406 and the blue transmitting filter 405B of the blue color pixel B. The size of the photodiode PD may be same for all the pixels.

According to the ninth embodiment, for the pixel columns consisting of the red color pixels R and the non-color pixels NC, the pixel size of the non-color pixels NC having a large transmittance is enlarged. For the pixel columns consisting of the blue color pixels B and the green color pixels G, the pixel size of the green color pixels G having a large transmittance is enlarged.

In this way, the electric signals obtained from the pixel columns consisting of the red color pixels R and the non-color pixels NC and the electric signals obtained from the pixel columns consisting of the blue color pixels B and the green color pixels G can be set to be even. Therefore, effects is exerted that higher sensitivity can be facilitated and images having a high S/N ratio and high image quality can be obtained even when lighting is dim.

The imaging element itself can be downsized by adjusting the sensitivity of the non-color pixel NC and the green color pixel G to be same as conventional sensitivity. Therefore, downsizing of the imaging element can be facilitated and associated with this downsizing, reduction of the manufacturing cost can also be facilitated.

According to the ninth embodiment, among the red color pixel R, the green color pixel G, the blue color pixel B, and the non-color pixel NC, at least the pixel circuit 300 of the non-color pixel NC may have an OFD structure. The OFD includes a vertical type (VOD) and a lateral type (LOD).

Figure 26:
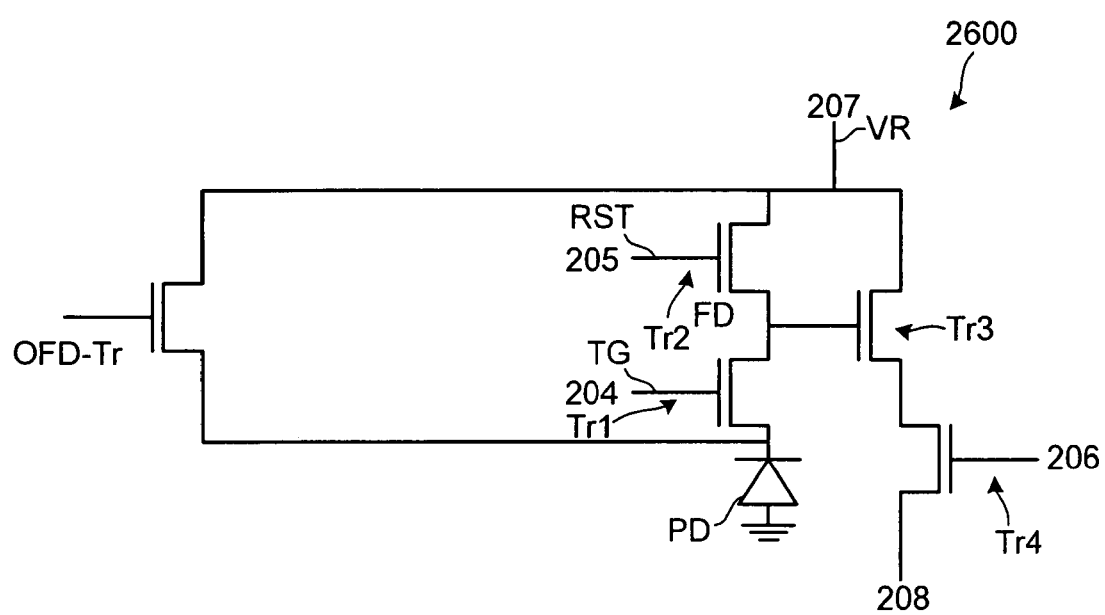
FIG. 26 is a pixel circuit diagram in a pixel using an overflow drain (OFD)

Description is given for a pixel circuit in a pixel that uses the OFD. FIG. 26 is a pixel circuit diagram in a pixel using the OFD. The components that are the same as those shown in FIG. 3 are given the same reference numerals and description thereof is omitted. A pixel circuit 2600 shown in FIG. 26 is configured to have one additional metal oxide semiconductor (MOS) transistor to the pixel circuit 300 shown in FIG. 3. The added MOS transistor is an OFD that is provided on the side in a plane and, therefore, this transistor is referred to as LOD.

The pixel circuit 2600 controls the gate level of a transistor OFD-Tr such that the transistor OFD-Tr is in an off state during exposure and transfer, that is, a state where the transistor OFD-Tr has a sufficiently high resistance, and during any other time, the transistor OFD-Tr is in an on state or an intermediate state (an on state with a specific degree of resistance) between on and off states.

According to the pixel circuit 2600, by providing the transistor OFD-Tr in the vicinity of the photodiode PD, even when a large amount of photo-electric charge has been generated, the photo-electric charge can be discharged to a substrate. Hence, the occurrence of cross-talk and blur in images caused by leakage of photo-electric charge into the photodiodes PD of other pixels can be prevented.

In particular, the charge in the non-color pixel NC tend to saturate and overflow even when the pixel size of the non-color pixel NC is same as or smaller than that of the color pixels because the non-color pixel NC is more sensitive than the color pixels. Therefore, the occurrence of cross-talk and blur in images caused by leakage of photo-electric charge into the photodiodes PD of other pixels can be prevented by employing the OFD structure in at least the non-color pixel NC.

Description has been given for the case where the imaging element is a CMOS imaging element such as a 4Tr-APS according to the ninth embodiment. However, when the imaging element is a CCD device, the pixel circuit thereof may also employ the OFD structure, and the same actions and effects as those in the case of the CMOS imaging element can be obtained.

Description is given for a tenth embodiment of the present invention. Configuration according to the tenth embodiment has pixels that are the same as those in the eighth embodiment in which the pixel size of the green color pixels G is enlarged. The imaging element according to the tenth embodiment can be applied to the imaging apparatuses 1600, 1700, 1800, 1900, and 2000 of the first to the fourth embodiments.

Figure 27:
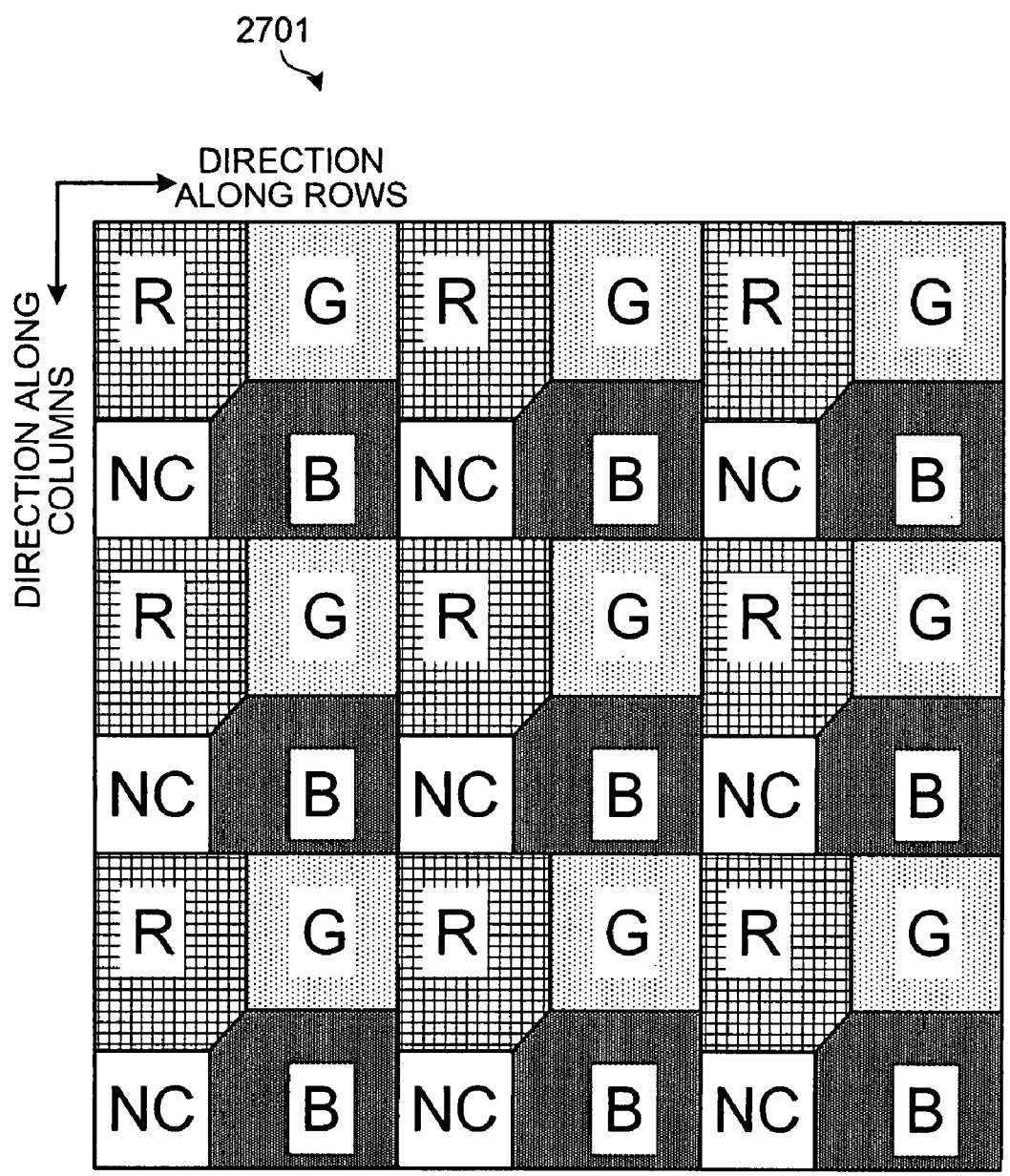
FIG. 27 is a diagram illustrating a two-dimensionally arranged pixel group of an imaging element according to a tenth embodiment of the present invention.

FIG. 27 is a diagram explaining a two-dimensionally arranged pixel group of the imaging element according to the tenth embodiment of the present invention. A two-dimensionally arranged pixel group 2701 shown in FIG. 27 is configured to have the two-dimensionally arranged pixel group 2401 of the eighth embodiment shown in FIG. 24 in which the pixel size of the green color pixels G is enlarged to be larger than the pixel size of the non-color pixels NC. When the pixel size of the green color pixels G is larger than the pixel size of the non-color pixels NC, the pixel size of the green color pixels G may be same as the pixel sizes of the red color pixels R and the blue color pixels B.

The pixel size represents the size of a pixel and, for example, the size of the photodiode PD, the sizes of the micro-lens 406, the color separating filter 405, and the transparent filter 405NC in the pixel circuit 300 of each pixel may differ.

More specifically, the photodiode PD, the micro-lens 406, and the transparent filter 405NC of the non-color pixel NC are smaller than the photodiode PD, the micro-lens 406, and the red transmitting filter 405R of the red color pixel R, and are also smaller than the photodiode PD, the micro-lens 406, and the blue transmitting filter 405B of the blue color pixel B, and again are also smaller than the photodiode PD, the micro-lens 406, and the green transmitting filter 405G of the green color pixel G. The size of the photodiode PD may be same for all the color pixels.

According to the tenth embodiment, improvement of the sensitivity of the red color pixels R, the green color pixels G, and the blue color pixels B can be facilitated and the difference in sensitivity between those color pixels and the non-color pixels NC can be reduced. Therefore, higher sensitivity of the imaging element can be facilitated and images having a high S/N ratio and high image quality can be obtained even when lighting is dim.

The imaging element itself can be downsized by adjusting the sensitivity of the non-color pixel NC and the green color pixel G to be same as the conventional sensitivity. Therefore, downsizing of the imaging element can be facilitated and associated with this downsizing, a reduction of the manufacturing cost can also be facilitated.

Description is given for an eleventh embodiment of the present invention. Configuration according to the eleventh embodiment has pixels that are the same as those in the first embodiment in which the pixel size of the non-color pixels NC is enlarged. The imaging element according to the eleventh embodiment can be applied to the imaging apparatuses 1600, 1700, 1800, 1900, and 2000 of the first to the fourth embodiments.

Figure 28:
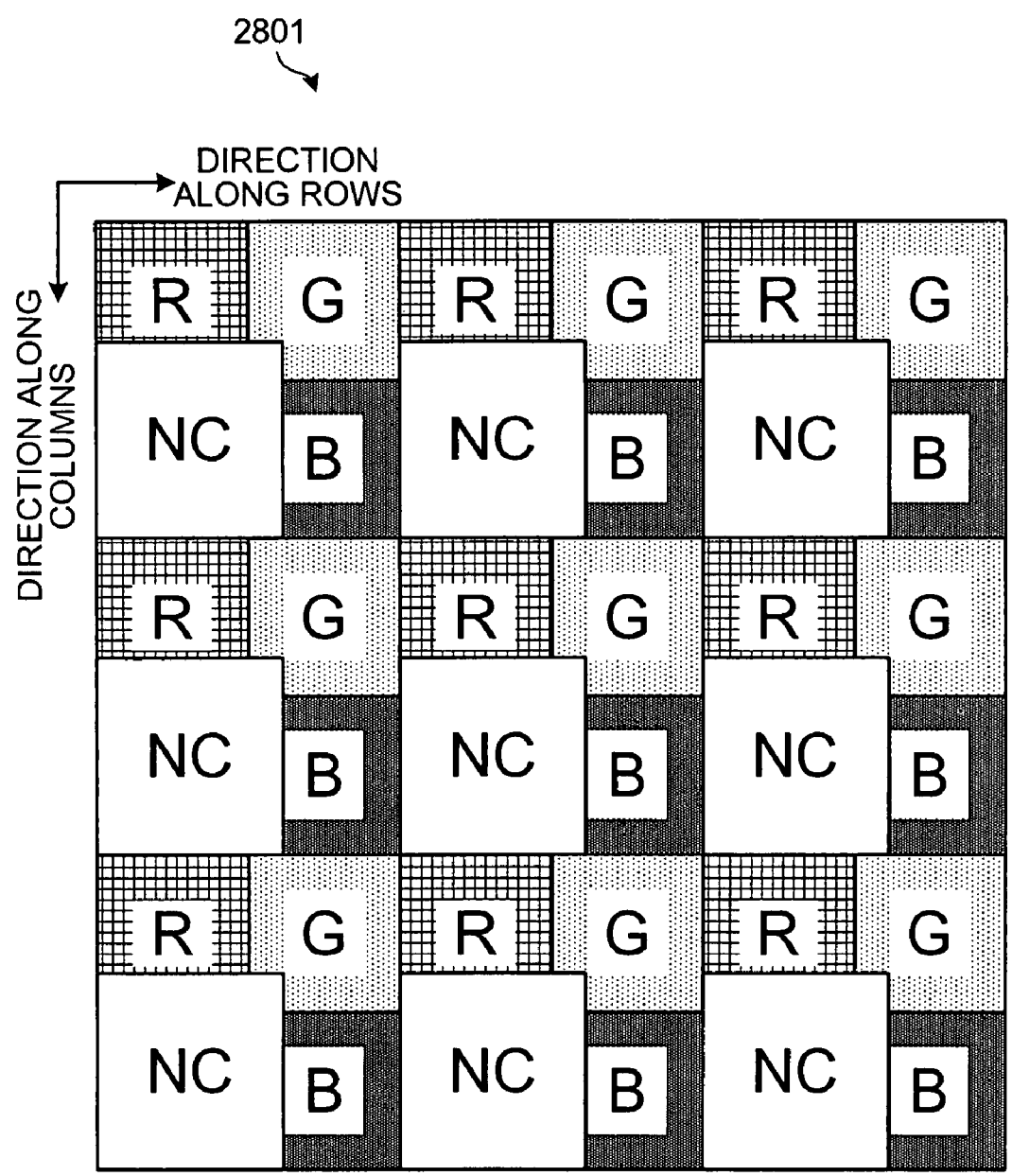
FIG. 28 is a diagram illustrating a two-dimensionally arranged pixel group of an imaging element according to an eleventh embodiment of the present invention.
Figure 29:
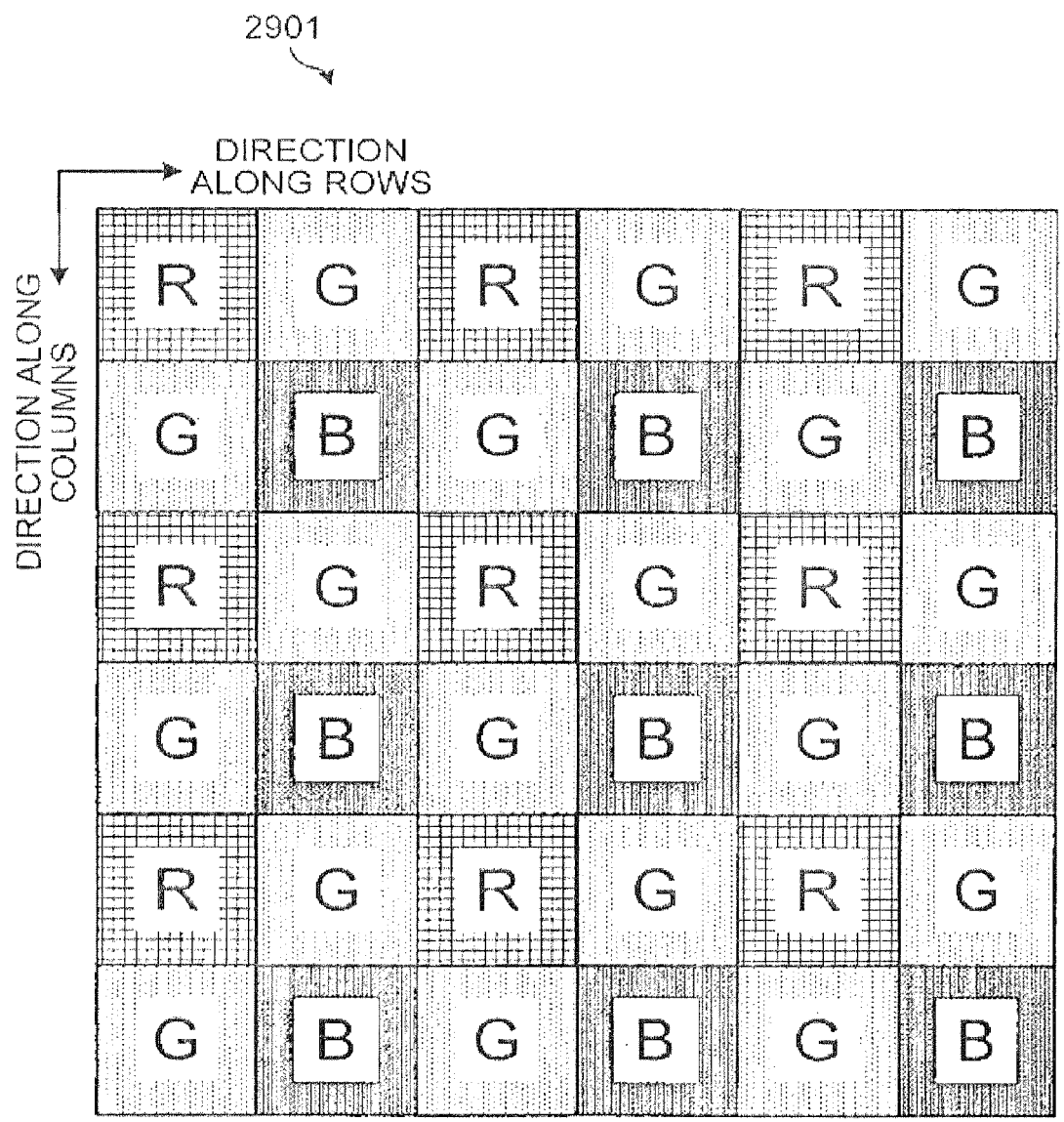
FIG. 29 is a diagram illustrating a two-dimensionally arranged pixel group of a conventional solid-state imaging element.

FIG. 28 is a diagram illustrating a two-dimensionally arranged pixel group of the imaging element according to the eleventh embodiment of the present invention. A two-dimensionally arranged pixel group 2801 shown in FIG. 28 is configured to have the pixels of the two-dimensionally arranged pixel group 101 of the first embodiment shown in FIG. 1 of which the pixel size of the non-color pixels NC is set to be larger than the pixel size of the color pixels (the red color pixels R, the green color pixels G, and the blue color pixels B). When the pixel size of the red color pixels R, the green color pixels G, and the blue color pixels B is smaller than that of the non-color pixel NC, the size may be the same for all the color pixels.

The pixel size represents the size of a pixel and, for example, the size of the photodiode PD, the sizes of the micro-lens 406, the color separating filter 405, and the transparent filter 405NC in the pixel circuit 300 of each pixel may differ.

More specifically, the photodiode PD, the micro-lens 406, and the transparent filter 405NC of the non-color pixel NC are larger than the photodiode PD, the micro-lens 406, and the red transmitting filter 405R of the red color pixel R, and are also larger than the photodiode PD, the micro-lens 406, and the blue transmitting filter 405B of the blue color pixel B, and again are also larger than the photodiode PD, the micro-lens 406, and the green transmitting filter 405G of the green color pixel G. The size of the photodiode PD may be same for all the color pixels.

According to the eleventh embodiment, the sensitivity of the non-color pixels NC can be improved and the brightness information obtained when lighting is dim can be made higher. Therefore, images having a high S/N ratio and high image quality can be obtained even when lighting is dim. In particular, application of the imaging element according to the eleventh embodiment is effective in cases where the brightness information obtained when lighting is dim is important, such as in monitoring cameras.

The imaging element itself can be downsized by adjusting the sensitivity of the non-color pixel NC and the green color pixel G to be same as conventional sensitivity. Therefore, downsizing of the imaging element can be facilitated and associated with this downsizing, a reduction of the manufacturing cost can also be facilitated.

Though description has been given taking an example of a 4Tr-type CMOS imaging element as the imaging element in the above first to eleventh embodiments, any solid state imaging elements including a charge coupled (CCD) device can be applied. The CMOS imaging element is not limited to the 4Tr-type CMOS imaging element, and other APSs such as a 3Tr-type APS and a 5Tr-type APS may also be applied. The CMOS imaging element is not limited to an APS and a passive pixel sensor (PPS) may be applied.

Though the examples of arrangement of the color separating filters 405 and the transparent filters 405NC that transmit different colors and have different pixel sizes have been shown in the above first to eleventh embodiments, the optimal arrangement of the color separating filters 405 and the transparent filters 405NC may be selected and combined with circuits and devices corresponding to the configuration of a reading circuit of an APS such as a CMOS imaging element and the device configuration of a CCD device. Hence, effects such as reduction of noises, reduction of blur, etc., can be obtained.

In the above first to eleventh embodiments, the color separating filters 405 and the transparent filters 405 NC are configured to be respectively disposed between the micro lenses 406 and the photodiodes PD. However, the color separating filters 405 and the transparent filters 405NC may be configured to be disposed before the micro lenses 406.

For example, by having formed the color separating filter 405 and the transparent filters 405NC on a glass substrate, light transmitted through the color separating filters 405 and the transparent filters 405NC can be received by the photodiodes PD through the micro lens 406. According to this configuration, the first to the eleventh embodiments may be applied to an imaging element formed with no color separating filter 405.

According to the imaging apparatus, the imaging element, and the image processing method of the embodiments, high-resolution brightness can be facilitated when lighting is bright and high sensitivity can be facilitated when lighting is dim, and therefore, a higher quality of captured images can be facilitated regardless of the degree of lighting. The size of each pixel can be decreased because the sensitivity obtained when lighting is dim can be improved and, therefore, reduced size of the imaging element and the imaging apparatus can be facilitated, thereby, enabling the issue of large pixel size to be easily addressed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An imaging apparatus comprising:
    an imaging element having a pixel group that is two-dimensionally-arranged, wherein the pixel group includes color pixels each having a color separating filter that transmits a specific color and non-color pixels that do not have the color separating filter;
    a first brightness information producing unit that produces first brightness information of a pixel in the pixel group based on an electric signal output from the pixel or electric signals output from non-color pixels surrounding the pixel;
    a color signal calculating unit that calculates a color signal of the pixel;
    a second brightness information producing unit that produces second brightness information of the pixel based on the color signal; and
    a selecting unit that selects any one of the first brightness information and the second brightness information as a selected brightness information, wherein the imaging apparatus outputs the selected brightness information.

2. The imaging apparatus according to claim 1, wherein the first brightness information producing unit
    produces the first brightness information based on the electric signal converted by a photoelectric converting unit of the pixel when the pixel is the non-color pixel, and
    produces the first brightness information based on the electric signals converted by photoelectric converting units of the non-color pixels surrounding the pixel when the pixel is the color pixel.

3. The imaging apparatus according to claim 1, wherein the color signal calculating unit
    calculates the color signal based on electric signals converted by the photoelectric converting units of the pixel and the color pixels surrounding the pixel when the pixel is the color pixel, and
    calculates the color signal of the pixel based on electric signals converted by the photoelectric converting units of the color pixels surrounding the pixel when the pixel is the non-color pixel.

4. The imaging apparatus according to claim 1, further comprising:
    a selection control unit that controls the selecting unit to select any one of the first brightness information and the second brightness information as the selected brightness information based on an exposure information that is obtained when the imaging apparatus captures a subject.

5. The imaging apparatus according to claim 1, further comprising:
    a selecting unit that selects any one of the first brightness information producing unit and the second brightness information producing unit as a selected brightness information producing unit, wherein
    the imaging apparatus outputs brightness information produced by the selected brightness information producing unit.

6. The imaging apparatus according to claim 5, further comprising:
    a selection control unit that controls the selecting unit to select any one of the first brightness information producing unit and the second brightness information producing unit as a selected brightness information producing unit based on an exposure information that is obtained when the imaging apparatus captures a subject.

7. The imaging apparatus according to claim 1, further comprising:
- a parameter setting unit that sets parameters concerning an amount of light relative to a subject based on an exposure information that is obtained when the imaging apparatus captures the subject; and
- a third brightness information producing unit that produces third brightness information of the pixel based on the first brightness information, the second brightness information, and the parameters.

8. The imaging apparatus according to claim 7, further comprising:
- a color information calculating unit that calculates color information of the pixel based on the color signal; and
- a color information producing unit that produces color information of the pixel based on the color information and the parameters.

9. The imaging apparatus according to claim 1, wherein the color separating filters include red filters, blue filters, and green filters, and
- among the color pixels of the imaging element, green pixels each equipped with the green filter and the non-color pixels of the imaging element are arranged diagonally from each other in the pixel group.

10. The imaging apparatus according to claim 1, wherein photoelectric converting units of at least the non-color pixels employ an overflow drain structure.

11. The imaging apparatus according to claim 1, wherein the color separating filters include red filters, blue filters, and green filters,
- in the imaging element, among the color pixels, red pixels each equipped with the red filter and blue color pixels each equipped with the blue filter are arranged in an output direction of electric signals converted by photoelectric converting units of the red pixels and the blue pixels.

12. The imaging apparatus according to claim 1, wherein the non-color pixels each have any one of a transparent filter and a transparent insulating layer.

13. The imaging apparatus according to claim 1, further comprising:
- a color information calculating unit that calculates color information of the pixel based on the color signal.

14. The imaging apparatus according to claim 1, wherein the color separating filters include red filters, blue filters, and green filters,
- among the color pixels are red pixels each respectively equipped with the red filter and having a red pixel size, and blue pixels each respectively equipped with the blue filter and having a blue pixel size, and
- a size of the non-color pixel is larger than the red pixel size and the blue pixel size.

15. The imaging apparatus according to claim 14, wherein among the color pixels are green pixels each respectively equipped with the green filter and having a green pixel size, and the green pixel size is larger than the red pixel size and the blue pixel size.

16. The imaging apparatus according to claim 15, wherein the size of the non-color pixel is larger than the green pixel size.

17. The imaging apparatus according to claim 1, wherein the color separating filters include red filters, blue filters, and green filters,
- in the imaging element, among the color pixels, green pixels each equipped with the green filter are arranged with the non-color pixels in an output direction, and
- in a pixel area of two rows by two columns in the pixel group, a first size corresponding to a size of the non-color pixel in the pixel area and a size of the green pixel in the pixel area is the same as a second size corresponding to a size of a red pixel in the pixel area and a size of a blue pixel in the pixel area,
- the red pixel and the blue pixel also among the color pixels and respectively equipped with the red filter and the blue filter.

18. The imaging apparatus according to claim 1, wherein the color separating filters include red filters, blue filters, and green filters,
- in the imaging element, among the color pixels, green pixels each equipped with the green filter are arranged with the non-color pixels in an output direction, and
- in a pixel area of two rows by two columns in the pixel group, a first size corresponding to a size of the non-color pixel in the pixel area and a size of the green pixel in the pixel area differs from a second size corresponding to a size of a red pixel in the pixel area and a size of a blue pixel in the pixel area, the red pixel and the blue pixel also among the color pixels and respectively equipped with the red filter and the blue filter.

19. The imaging apparatus according to claim 18, wherein the first size is smaller than the second size.

* * * * *